US012794542B2

(12) United States Patent
Abedini et al.

(10) Patent No.: US 12,794,542 B2
(45) Date of Patent: Nov. 10, 2026

(54) SYNCHRONIZATION SIGNAL BLOCK FORWARDING

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/444,337

(22) Filed: Aug. 3, 2021

(65) Prior Publication Data

US 2022/0077922 A1 Mar. 10, 2022

Related U.S. Application Data

(60) Provisional application No. 62/706,767, filed on Sep. 9, 2020.

(51) Int. Cl.

| | |
|---|---|
| ***H04B 7/155*** | (2006.01) |
| ***H04L 5/00*** | (2006.01) |
| ***H04W 48/10*** | (2009.01) |
| ***H04W 56/00*** | (2009.01) |
| ***H04W 72/0446*** | (2023.01) |
| ***H04W 72/121*** | (2023.01) |
| ***H04W 72/23*** | (2023.01) |

(52) U.S. Cl.

CPC ......... *H04B 7/15528* (2013.01); *H04L 5/005* (2013.01); *H04W 48/10* (2013.01); *H04W 56/001* (2013.01); *H04W 72/0446* (2013.01); *H04W 72/121* (2013.01); *H04W 72/23* (2023.01)

(58) Field of Classification Search

None

See application file for complete search history.

(56) References Cited

U.S. PATENT DOCUMENTS

| | | | | |
|---|---|---|---|---|
| 11,375,527 | B1 * | 6/2022 | Eyuboglu | H04B 7/15528 |
| 11,838,151 | B1 * | 12/2023 | Jones | H04L 25/0224 |
| 2013/0223328 | A1 * | 8/2013 | Obuchi | H04W 36/0072 370/315 |
| 2019/0110242 | A1 | 4/2019 | Islam et al. | |

(Continued)

FOREIGN PATENT DOCUMENTS

| | | | |
|---|---|---|---|
| CN | 110611948 | A | 12/2019 |
| WO | WO-2018141981 | A1 | 8/2018 |
| WO | WO-2020092261 | A1 | 5/2020 |

OTHER PUBLICATIONS

International Search Report and Written Opinion—PCT/US2021/071096—ISA/EPO—Nov. 12, 2021.

(Continued)

*Primary Examiner* — Suk Jin Kang

(74) *Attorney, Agent, or Firm* — Harrity & Harrity, LLP

(57) ABSTRACT

Various aspects of the present disclosure generally relate to wireless communication. In some aspects, a forwarding node may receive one or more synchronization signal block (SSB) communications that are to be transmitted in an SSB period. The forwarding node may store the one or more SSB communications. The forwarding node may transmit the one or more SSB communications in the SSB period. Numerous other aspects are provided.

30 Claims, 15 Drawing Sheets

(56) References Cited

U.S. PATENT DOCUMENTS

2019/0200307 A1 6/2019 Si et al.
2019/0380099 A1* 12/2019 Hakola ................ H04B 7/0617
2020/0007222 A1* 1/2020 Ruder .................. H04B 7/0837
2020/0059927 A1 2/2020 Sun et al.
2020/0076568 A1* 3/2020 Nguyen .................. H04L 7/042
2020/0177432 A1* 6/2020 Kwon ................. H04L 27/2675
2020/0274609 A1* 8/2020 Youtz .................... H04W 16/28
2020/0336260 A1* 10/2020 Liu ..................... H04W 84/047
2020/0403689 A1* 12/2020 Rofougaran ........ H04W 52/245
2020/0413359 A1* 12/2020 Li ..................... H04W 74/0808
2021/0013959 A1* 1/2021 Yuan .................. H04B 7/15571
2021/0014809 A1* 1/2021 Lee ....................... H04L 5/0051
2021/0120481 A1* 4/2021 Cheng ................... H04W 24/02
2021/0152306 A1* 5/2021 Liu ....................... H04L 5/0035
2021/0168880 A1* 6/2021 Ohara ................. H04W 74/002
2021/0184984 A1* 6/2021 Ganesan ................. H04L 47/56
2021/0212007 A1* 7/2021 Liu .................... H04B 7/15528
2021/0234646 A1* 7/2021 Koskela ................ H04L 5/0082
2021/0235513 A1* 7/2021 Kim .................. H04W 74/0891
2021/0242916 A1* 8/2021 Lomayev ........... H04B 7/15557
2021/0282079 A1* 9/2021 Wu ..................... H04W 56/001
2021/0297169 A1* 9/2021 Yoon ..................... H04W 56/00
2021/0297175 A1* 9/2021 Yu ........................... H04L 5/005
2021/0297969 A1* 9/2021 Myung .............. H04W 56/001
2021/0306967 A1* 9/2021 Kang ................ H04W 56/0015
2021/0315026 A1* 10/2021 Jung ................. H04W 74/0808
2021/0321349 A1* 10/2021 Tang ..................... H04L 5/0051
2021/0337490 A1* 10/2021 Shen ..................... H04L 5/0053
2021/0360550 A1* 11/2021 Ying ..................... H04W 24/02
2021/0367825 A1* 11/2021 Tang ..................... H04L 5/0053
2021/0376945 A1* 12/2021 Lin ....................... H04L 5/0051
2021/0377890 A1* 12/2021 Shen ....................... H04L 5/005
2022/0007414 A1* 1/2022 Kim ................... H04W 74/006
2022/0014978 A1* 1/2022 Chong .................. H04W 76/27
2022/0039032 A1* 2/2022 Wei ........................ H04B 7/155
2022/0061004 A1* 2/2022 Wigard ............. H04W 72/0446
2022/0094636 A1* 3/2022 Du ........................ H04L 5/0053
2022/0095252 A1* 3/2022 Ko ........................ H04L 5/0053
2022/0095253 A1* 3/2022 Harada ................. H04L 5/0053
2022/0104154 A1* 3/2022 Wei ..................... H04W 36/305
2022/0116821 A1* 4/2022 Wei ..................... H04L 27/2636
2022/0150849 A1* 5/2022 Zhao ................... H04L 27/2626
2022/0174630 A1* 6/2022 Wei ................... H04W 56/0015
2022/0217660 A1* 7/2022 Liu ................... H04W 72/0446
2022/0232496 A1* 7/2022 Kim .................. H04W 56/0015
2022/0247464 A1* 8/2022 Lomayev ................. H04B 1/04
2022/0247531 A1* 8/2022 Kim ...................... H04W 48/12
2022/0248385 A1* 8/2022 Cha ..................... H04W 72/044
2022/0263615 A1* 8/2022 Viering ................. H04L 5/0073
2022/0272664 A1* 8/2022 Takeda ................ H04W 56/001
2022/0303924 A1* 9/2022 Dahlman .............. H04L 5/0091
2022/0312327 A1* 9/2022 Xu ...................... H04W 56/001
2022/0312352 A1* 9/2022 Hwang ................. H04L 5/0048
2022/0322122 A1* 10/2022 Fujimura .............. H04W 4/027
2022/0346151 A1* 10/2022 Takeda .............. H04W 74/0833
2022/0377683 A1* 11/2022 Myung ................. H04L 5/0048
2022/0377687 A1* 11/2022 Wang ....................... H04B 7/08
2022/0386185 A1* 12/2022 Wang ................ H04W 36/0058
2022/0386187 A1* 12/2022 Yuan ................. H04W 36/0061
2022/0386253 A1* 12/2022 Kim ...................... H04L 5/0035
2022/0394638 A1* 12/2022 Yang ................... H04W 56/001
2022/0417884 A1* 12/2022 Jung ................. H04W 56/0035
2023/0140323 A1* 5/2023 Wang .................... H04L 27/261
370/329
2023/0171142 A1* 6/2023 Kassas ................ H04W 56/001
370/208
2024/0163813 A1* 5/2024 Zou ....................... H04W 52/52

OTHER PUBLICATIONS

LG Electronics: "Frequency Re-Use Factor Indication with PSCH," 3GPP Draft, 3GPP TSG GERAN #67, GP-150702, Frequency Reuse Factor Indication, 3rd Generation Partnership Project (3GPP), Mobile Competence Centre, 650, Route Des Lucioles, F-06921, Sophia-Antipolis Cedex, France, vol. Tsg GERAN. No. Yinchuan, China, Aug. 10, 2015-Aug. 14, 2015, Aug. 5, 2015 (Aug. 5, 2015), XP051627351, 3 pages, Retrieved from the Internet: URL: http://www.3gpp.org/ftp/tsg%5Fgeran/TSG%5FGERAN/GERAN%5F67%5FYinchuan/Docs/GP%2D150702%2Ezip [retrieved on Aug. 5, 2015] section 1.

SAMSUNG: "Support of SSBs for IAB Node Discovery and Measurement," 3GPP Draft, 3GPP TSG RAN WG1 #96, R1-1902269, Inter Node Discovery_V3, 3rd Generation Partnership Project (3GPP), Mobile Competence Centre, 650, Route Des Lucioles, F-06921, Sophia- Antipolis Cedex, France, vol. Ran WG1. No. Athens, Greece, Feb. 25, 2019-Mar. 1, 2019, Feb. 15, 2019 (Feb. 15, 2019), XP051599964, 6 pages, Retrieved from the Internet: URL: http://www.3gpp.org/ftp/tsg%5Fran/WG1%5FRL1/TSGR1%5F96/Docs/R1%2D1902269%2Ezip [retrieved on Feb. 15, 2019], sections 1-4.

Ericsson, et al., "CR to TS 38.101-1 on Combined updates from RAN4 #88bis and #89 (Including 7.5 kHz Carrier Shift in UL for Remaining Bands)", 3GPP TSG-RAN4 Meeting #82, RP-182836, Sorrento, Italy, Dec. 9, 2018-Dec. 13, 2018, 231 Pages.

Shihai Y., et al., "Sensitivity Analysis of Factors Affecting Eccentricity Error of Air-core Coil Based on Orthogonal Test", Electric Power Automation Equipment, vol. 38, No. 8, Aug. 2, 2018, 26 Pages.

* cited by examiner

SYNCHRONIZATION SIGNAL BLOCK FORWARDING

CROSS-REFERENCE TO RELATED APPLICATION

This Patent application claims priority to U.S. Provisional Patent Application No. 62/706,767, filed on Sep. 9, 2020, entitled "SYNCHRONIZATION SIGNAL BLOCK FORWARDING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for synchronization signal block (SSB) forwarding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a forwarding node includes receiving one or more synchronization signal block (SSB) communications that are to be transmitted in an SSB period; storing the one or more SSB communications; and transmitting the one or more SSB communications in the SSB period.

In some aspects, a method of wireless communication performed by a control node includes transmitting one or more SSB communications that are to be transmitted by a forwarding node in an SSB period; and transmitting one or more additional SSB communications in the SSB period with the one or more SSB communications.

In some aspects, a forwarding node for wireless communication includes memory; one or more processors coupled to the memory; and instructions stored in the memory and operable, when executed by the one or more processors, to cause the forwarding node to: receive one or more SSB communications that are to be transmitted in an SSB period; store the one or more SSB communications; and transmit the one or more SSB communications in the SSB period.

In some aspects, a control node for wireless communication includes memory; one or more processors coupled to the memory; and instructions stored in the memory and operable, when executed by the one or more processors, to cause the control node to: transmit one or more SSB communications that are to be transmitted by a forwarding node in an SSB period; and transmit one or more additional SSB communications in the SSB period with the one or more SSB communications.

In some aspects, a non-transitory computer-readable medium stores a set of instructions for wireless communication includes one or more instructions that, when executed by one or more processors of a forwarding node, cause the forwarding node to: receive one or more SSB communications that are to be transmitted in an SSB period; store the one or more SSB communications; and transmit the one or more SSB communications in the SSB period.

In some aspects, a non-transitory computer-readable medium stores a set of instructions for wireless communication includes one or more instructions that, when executed by one or more processors of a control node, cause the control node to: transmit one or more SSB communications that are to be transmitted by a forwarding node in an SSB period; and transmit one or more additional SSB communications in the SSB period with the one or more SSB communications.

In some aspects, an apparatus for wireless communication includes means for receiving one or more SSB communications that are to be transmitted in an SSB period; means for storing the one or more SSB communications; and means for transmitting the one or more SSB communications in the SSB period.

In some aspects, an apparatus for wireless communication includes means for transmitting one or more SSB communications that are to be transmitted by a forwarding node in an SSB period; and means for transmitting one or more additional SSB communications in the SSB period with the one or more SSB communications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
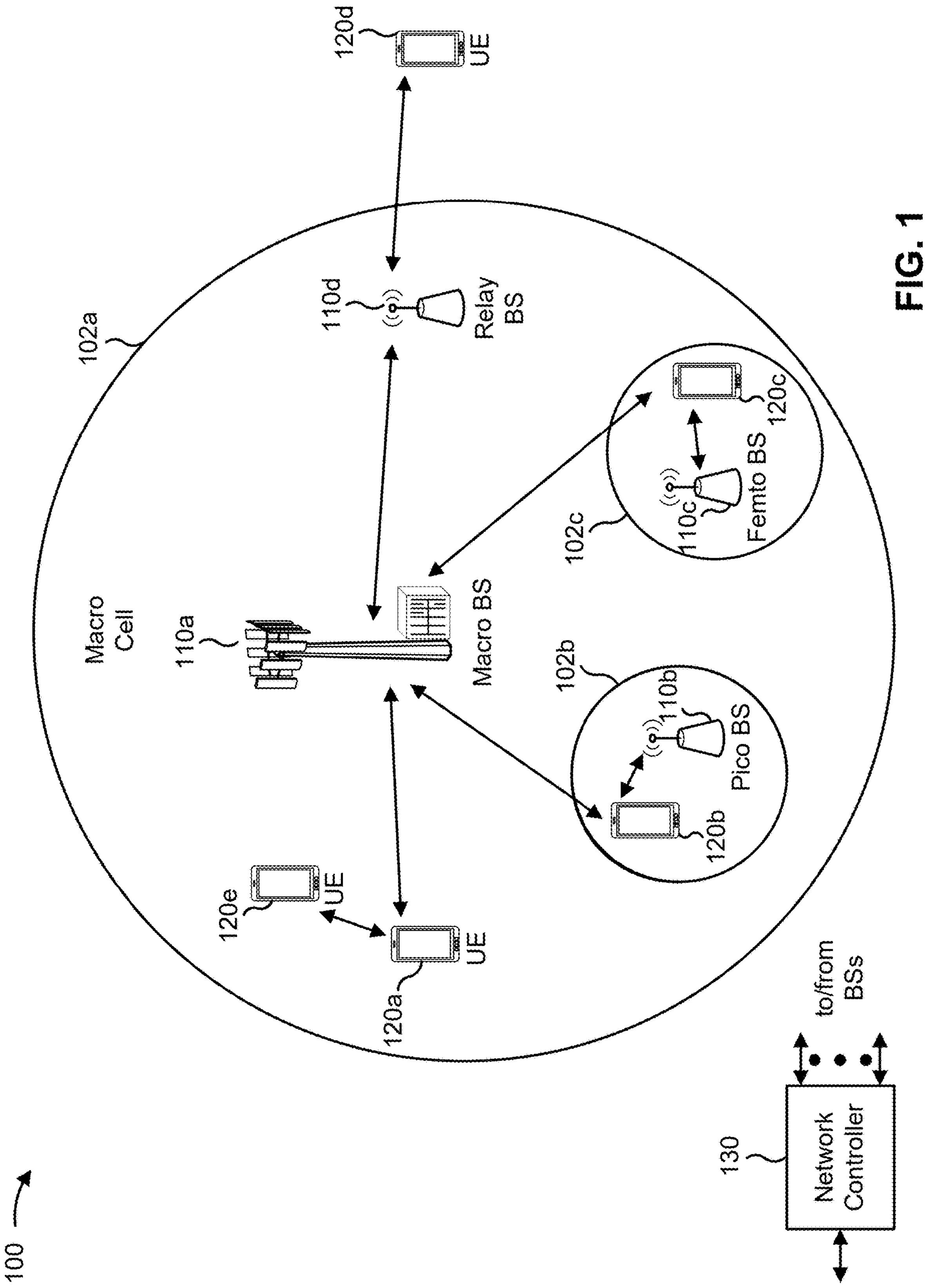
FIG. 1 is a diagram illustrating an example of a wireless network, in accordance with the present disclosure.

Analog repeaters may be used for forwarding synchronization signal block (SSB) transmissions of a base station, thereby improving a coverage of SSBs. However, the use of analog repeaters for forwarding SSBs may result in scalability issues. In particular, an analog repeater cannot store information associated with an SSB, and therefore must receive and forward a signal for the SSB in real time. Accordingly, for each repeater that is to forward SSBs, the base station must perform multiple transmissions of the SSBs. This consumes significant network resources and/or consumes significant computing resources of the base station, among other examples.

Some techniques and apparatuses described herein provide for efficient forwarding of SSBs. In some aspects, a forwarding node may receive, in advance, the SSBs that are to be forwarded by the forwarding node. The forwarding node may store the SSBs for subsequent transmission. The forwarding node may transmit the SSBs based at least in part on the stored SSBs. For example, the forwarding node may regenerate the SSBs based at least in part on the stored SSBs. In some aspects, the forwarding node may forward the SSBs in parallel with SSBs transmitted by a base station. For example, the forwarding node may forward the SSBs in a same SSB period in which the base station transmits SSBs. In this way, SSB transmission at the base station may be reduced, thereby conserving network resources and/or conserving computing resources at the base station, among other examples.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
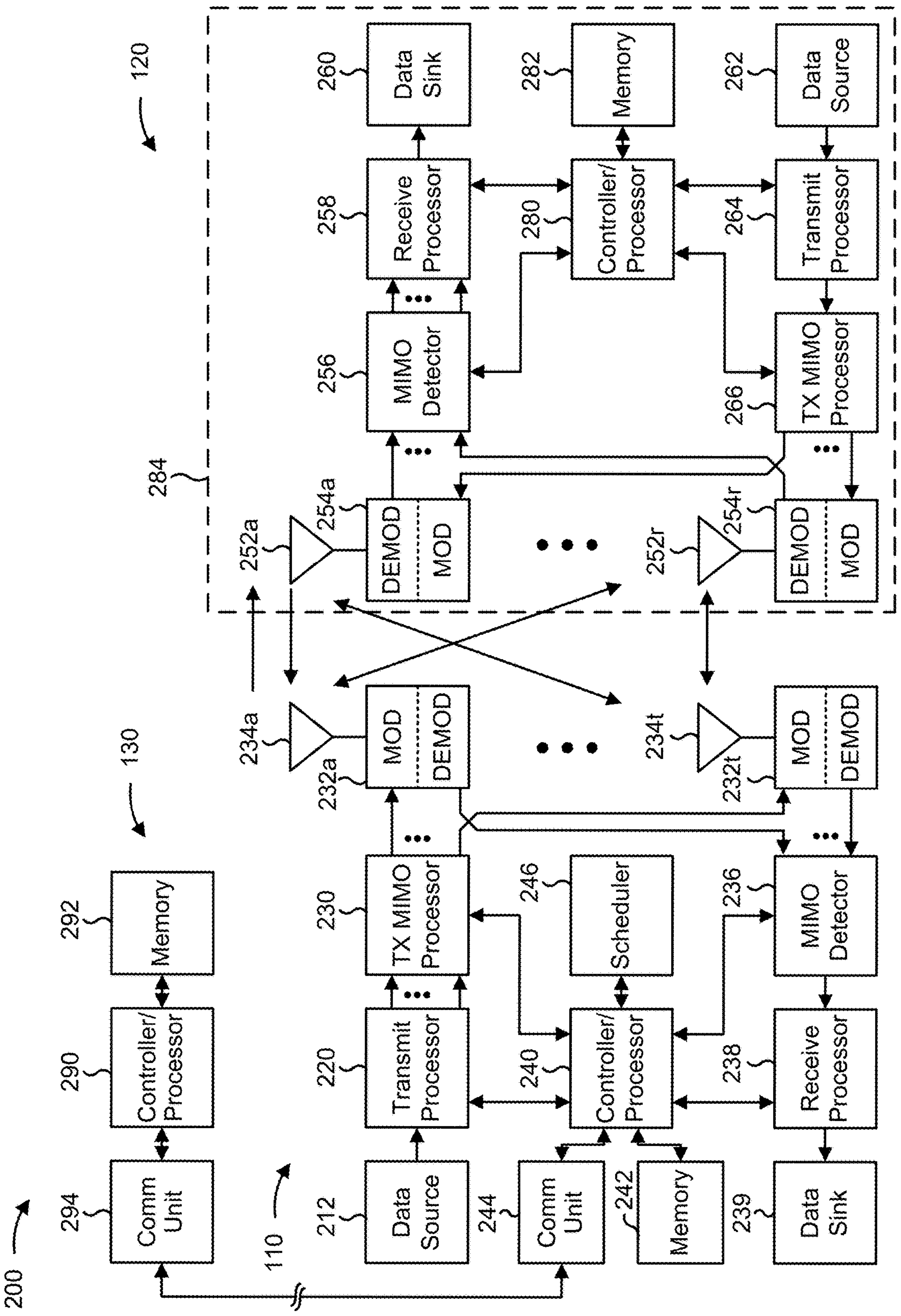
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 9-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 9-11).

Controller/processor 240 of base station 110, controller/processor 280 of UE 120, and/or any other component(s) of FIG. 2 may perform one or more techniques associated with SSB forwarding, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, a forwarding node (e.g., a wireless node, a base station 110, a UE 120, and/or an integrated access and backhaul (IAB) node, among other examples) includes means for receiving one or more SSB communications that are to be transmitted in an SSB period; means for storing the one or more SSB communications; and/or means for transmitting the one or more SSB communications in the SSB period. The means for the forwarding node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246; and/or antenna 252, demodulator 254, MIMO detector 256, receive processor 258, transmit processor 264, TX MIMO processor 266, modulator 254, controller/processor 280, and/or memory 282.

In some aspects, the forwarding node includes means for extracting information from the one or more SSB communications; and/or means for regenerating the one or more SSB communications based at least in part on the information.

In some aspects, the forwarding node includes means for receiving a primary synchronization signal or a secondary synchronization signal at a mobile termination of the forwarding node; and/or means for regenerating the primary synchronization signal or the secondary synchronization signal for the one or more SSB communications.

In some aspects, the forwarding node includes means for generating a primary synchronization signal or a secondary synchronization signal, for the one or more SSB communications, based at least in part on a physical cell identifier associated with a base station.

In some aspects, the forwarding node includes means for receiving a primary synchronization signal or a secondary synchronization signal for SSBs that are to be transmitted in the SSB period.

In some aspects, the forwarding node includes means for receiving a primary synchronization signal or a secondary synchronization signal for SSBs that are to be transmitted in the SSB period and one or more additional SSB periods.

In some aspects, the forwarding node includes means for receiving a primary synchronization signal or a secondary synchronization signal, for the one or more SSB communications, in resources that are not in a synchronization raster.

In some aspects, the forwarding node includes means for receiving a primary synchronization signal or a secondary synchronization signal, for the one or more SSB communications, in a downlink signal that is based at least in part on a resource remapping of the primary synchronization signal or the secondary synchronization signal.

In some aspects, the forwarding node includes means for receiving a physical broadcast channel or a demodulation reference signal, for the one or more SSB communications that are to be transmitted in the SSB period, in a time interval that is prior to the SSB period.

In some aspects, the forwarding node includes means for receiving a physical broadcast channel or a demodulation reference signal, for the one or more SSB communications, in resources that are in a synchronization raster.

In some aspects, the forwarding node includes means for receiving multiple physical broadcast channels or demodulation reference signals, for the one or more SSB communications and one or more additional SSB communications, multiplexed in a downlink signal.

In some aspects, the forwarding node includes means for performing channel estimation or equalization to extract information from the one or more SSB communications.

In some aspects, the forwarding node includes means for determining a content of a master information block based at least in part on decoding a physical broadcast channel of the one or more SSB communications; and/or means for receiving an indication of a transmission time for the master information block.

In some aspects, the forwarding node includes means for transmitting the one or more SSB communications in the SSB period with one or more additional SSB communications transmitted by a base station.

In some aspects, the forwarding node includes means for performing digital processing of the one or more SSB communications.

In some aspects, the forwarding node includes means for forwarding one or more non-SSB communications between a first wireless node and a second wireless node.

In some aspects, a control node (e.g., a wireless node, a base station 110, an IAB donor node, and/or an IAB node, among other examples) includes means for transmitting one or more SSB communications that are to be transmitted by a forwarding node in an SSB period; and/or means for transmitting one or more additional SSB communications in the SSB period with the one or more SSB communications. The means for the control node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the control node includes means for transmitting a primary synchronization signal or a secondary synchronization signal to a mobile termination of the forwarding node to enable the forwarding node to regenerate the primary synchronization signal or the secondary synchronization signal for the one or more SSB communications.

In some aspects, the control node includes means for transmitting a primary synchronization signal or a secondary synchronization signal for SSBs that are to be transmitted by the forwarding node in the SSB period.

In some aspects, the control node includes means for transmitting a primary synchronization signal or a secondary synchronization signal for SSBs that are to be transmitted by the forwarding node in the SSB period and one or more additional SSB periods.

In some aspects, the control node includes means for transmitting a primary synchronization signal or a secondary synchronization signal, for the one or more SSB communications, in resources that are not in a synchronization raster.

In some aspects, the control node includes means for transmitting a primary synchronization signal or a secondary synchronization signal, for the one or more SSB communications, in a downlink signal that is based at least in part on a resource remapping of the primary synchronization signal or the secondary synchronization signal.

In some aspects, the control node includes means for transmitting a physical broadcast channel or a demodulation reference signal, for the one or more SSB communications that are to be transmitted by the forwarding node in the SSB period, in a time interval that is prior to the SSB period.

In some aspects, the control node includes means for transmitting a physical broadcast channel or a demodulation reference signal, for the one or more SSB communications, in resources that are in a synchronization raster.

In some aspects, the control node includes means for transmitting multiple physical broadcast channels or demodulation reference signals, for the one or more SSB communications and one or more additional SSB communications, multiplexed in a downlink signal.

In some aspects, the control node includes means for transmitting pilot signals with the one or more SSB communications that are to be used by the forwarding node for performing channel estimation or equalization.

In some aspects, the control node includes means for transmitting an indication of a transmission time for the forwarding node to transmit a master information block that is decoded from a physical broadcast channel of the one or more SSB communications transmitted to the forwarding node.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
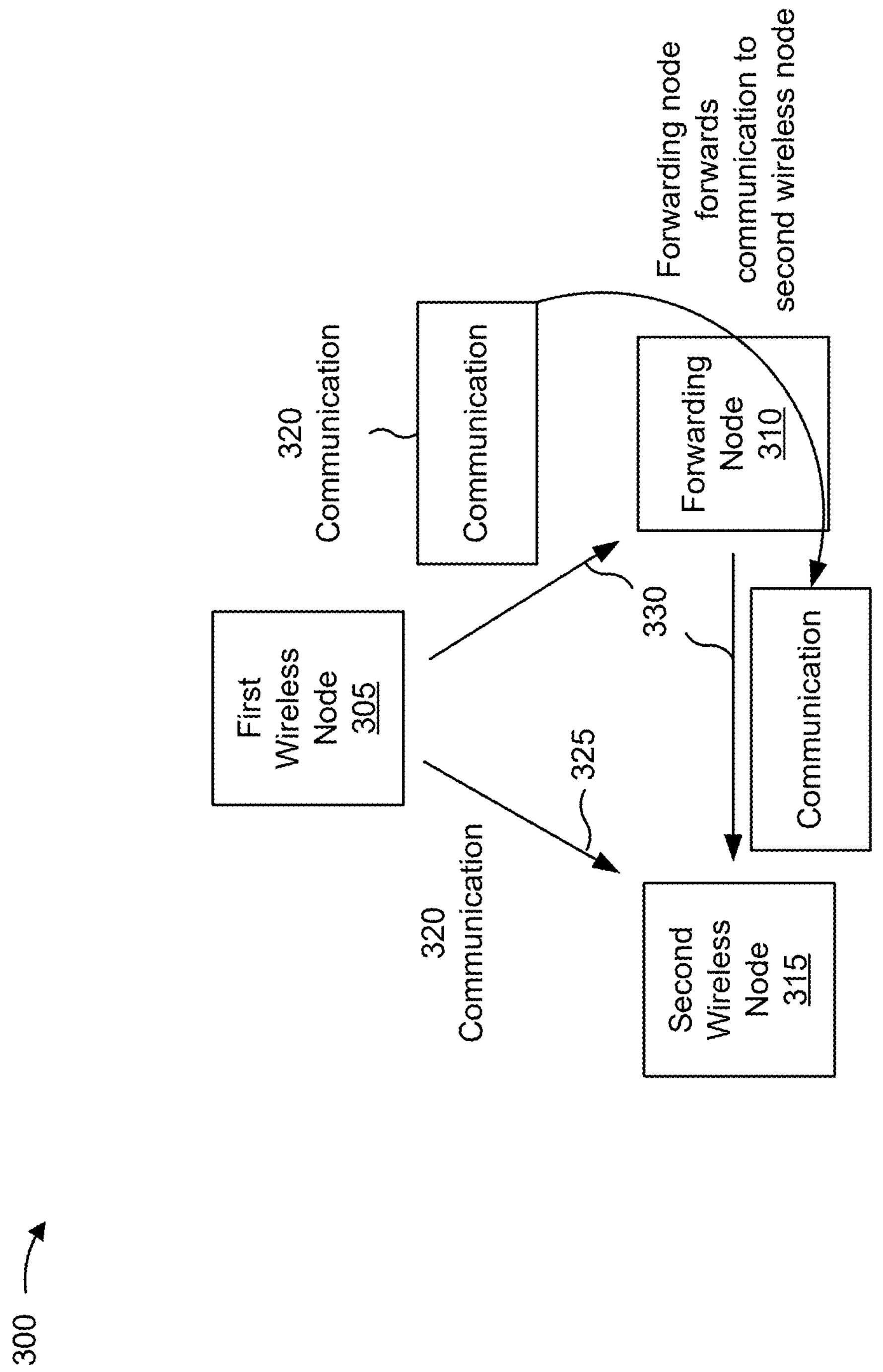
FIG. 3 is a diagram illustrating an example of a forwarding node that forwards communications between a first wireless node and a second wireless node, in accordance with the present disclosure.

FIG. 3 is a diagram illustrating an example 300 of a forwarding node (e.g., a repeater node or a relay node) that forwards communications between a first wireless node and a second wireless node, in accordance with the present disclosure. As shown, example 300 includes a first wireless node 305 (e.g., an integrated access and backhaul (IAB) node, an IAB donor, a base station 110, a UE 120, and/or the like), a forwarding node 310 (e.g., a repeater device, a relay device, a base station 110, a UE 120, a millimeter wave (mmWave) repeater, a mmWave relay, a digital repeater, an analog repeater, a digital relay, an analog relay, and/or the like), and a second wireless node 315 (e.g., an IAB node, an IAB donor, a base station 110, a UE 120, another forwarding node 310, and/or the like). In some aspects, the first wireless node 305 and/or the second wireless node 315 may be aware of the forwarding node 310. In some aspects, the first wireless node 305 and/or the second wireless node 315 may be unaware of the forwarding node 310.

As shown in FIG. 3, the first wireless node 305 may want to transmit a communication 320 (e.g., a data communication, a control communication, and/or the like) to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like.

Therefore, the first wireless node 305 may communicate with the second wireless node 315 using an indirect link 330. For example, the first wireless node 305 may transmit the communication 320 to the forwarding node 310. In some aspects, the first wireless node 305 may transmit the communication 320 directly to the forwarding node 310 (e.g., when the first wireless node 305 is aware of the forwarding node 310). In some aspects, the forwarding node 310 may be configured (e.g., by a control node, by the second wireless node 315, and/or the like) to receive the communication 320 from the first wireless node 305 (e.g., when the first wireless node 305 is unaware of the forwarding node 310).

As shown in FIG. 3, the communication 320 may arrive at the forwarding node 310 and be forwarded by the forwarding node 310. In some aspects, the forwarding node 310 is a repeater node (or repeater unit), and the repeater node may regenerate a signal of the communication 320. For example, the repeater node may receive a signal of the communication 320, extract tones from the signal, regenerate the signal based at least in part on the extracted tones, and transmit the regenerated signal. In some aspects, the forwarding node 310 is a relay node (or relay unit), and the relay node may generate a new signal based at least in part on a signal of the communication 320. For example, the relay node may receive a downlink signal that carries information associated with a communication (e.g., in-phase and quadrature (IQ) samples), generate a new signal based at least in part on the information, and transmit the new signal. As another example, the relay node may receive an uplink signal, generate a new signal that carries information associated with the uplink signal (e.g., IQ samples), and transmit the new signal.

In some cases, the indirect link 330 may be an access link, a side link, or a fronthaul link. For example, if the first wireless node 305 is a base station 110 and the second wireless node 315 is a UE 120, the indirect link 330 between the first wireless node 305 and the forwarding node 310 may be a fronthaul link. The indirect link 330 between the forwarding node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

As indicated above, FIG. 3 is provided as an example. Other examples may differ from what is described with respect to FIG. 3.

Figure 4:
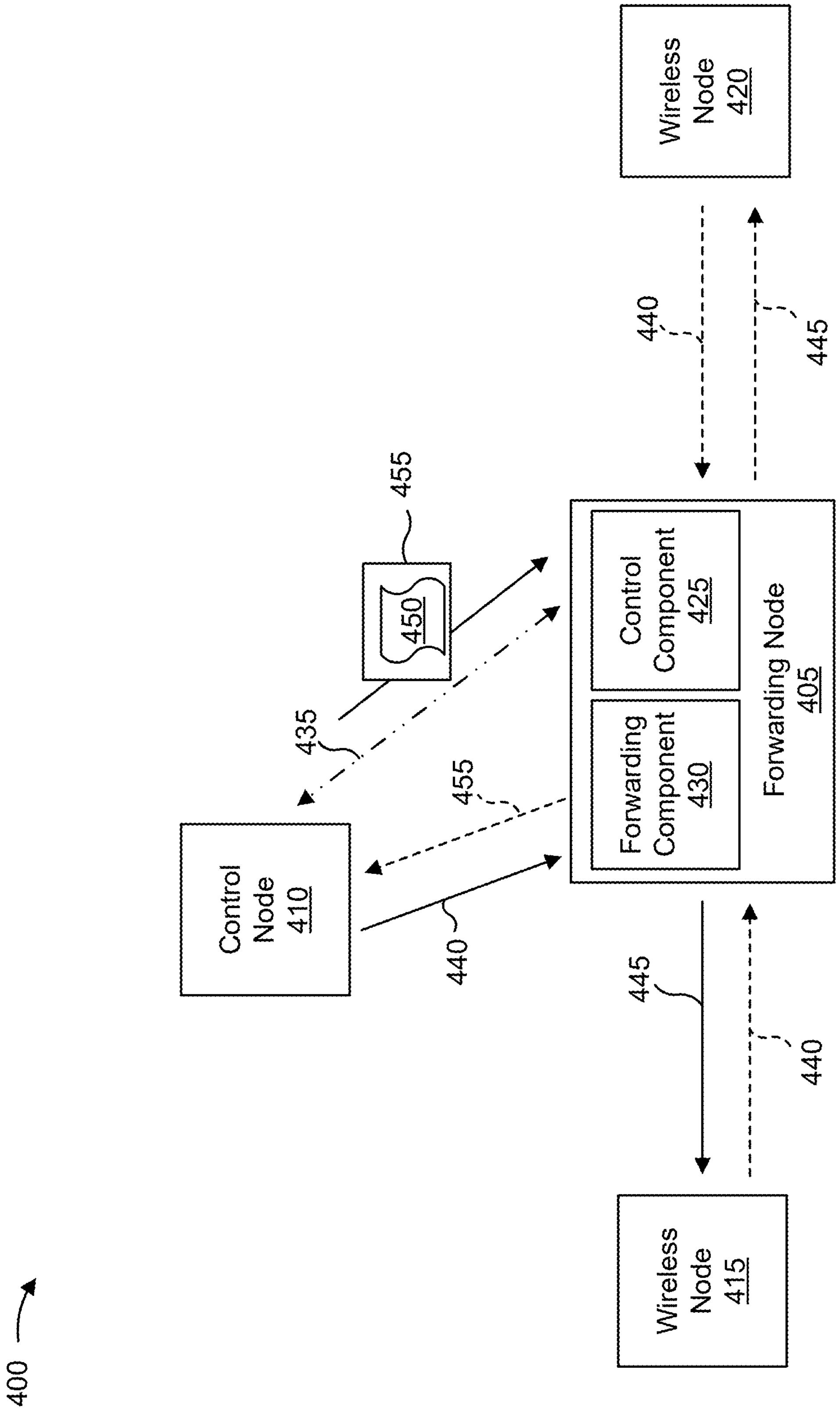
FIG. 4 is a diagram illustrating an example of forwarding a wireless signal using a forwarding node, in accordance with the present disclosure.

FIG. 4 is a diagram illustrating an example 400 of forwarding a wireless signal using a forwarding node 405, in accordance with the present disclosure. In some aspects, as shown, the forwarding node 405 may communicate with a control node 410 and one or more wireless nodes 415, 420 in a wireless network. In some aspects, the forwarding node 405 may include the forwarding node 310 shown in FIG. 3. In some aspects, the control node 410, the wireless node 415, and/or the wireless node 420 may be a wireless node such as, for example, the first wireless node 305 shown in FIG. 3, the second wireless node 315 shown in FIG. 3, an IAB node, an IAB donor, a base station 110 shown in FIG. 1, a UE 120 shown in FIG. 1, and/or the like.

In some aspects, the forwarding node 405 may be a digital repeater node (or repeater unit) configured to receive an incoming signal and to transmit a regenerated version of the incoming signal. For example, when implemented or otherwise configured as a digital repeater node, the forwarding node 405 may receive an incoming signal, extract tones from the incoming signal, regenerate the incoming signal based at least in part on the extracted tones, and transmit the regenerated signal as an outgoing signal. Additionally, or alternatively, the forwarding node 405 may be a digital relay node (or relay unit) configured to generate a new signal based at least in part on an incoming signal. For example, when implemented or otherwise configured as a digital relay node, the forwarding node 405 may receive a downlink signal (e.g., a fronthaul physical downlink shared channel (FH-PDSCH)) that carries information (e.g., IQ samples), generate a new downlink signal (e.g., a legacy PDSCH) that carries information about and/or from the downlink signal (e.g., the IQ samples), and transmit the new downlink signal to a receiver. As another example, when implemented or otherwise configured as a digital relay node, the forwarding node 405 may receive an uplink signal (e.g., a legacy physical uplink shared channel (PUSCH)), generate a new uplink signal (e.g., an FH-PUSCH) that carries information associated with the uplink signal (e.g., IQ samples), and transmit the new uplink signal to a receiver.

As shown in FIG. 4, the forwarding node 405 may include a control component 425 and a forwarding component 430. In some aspects, the control component 425 may facilitate establishing a wireless control interface 435 between the forwarding node 405 and the control node 410. In some aspects, the control component 425 may include one or more components and/or functions that are, or are similar to, one or more components of a base station (e.g., the base station 110 shown in FIGS. 1 and 2), a UE (e.g., the UE 120 shown in FIGS. 1 and 2), and/or the like. In some aspects, the forwarding component 430 may perform one or more forwarding (e.g., repeating and/or relaying) operations based at least in part on information received by the control component over the wireless control interface 435. For example, a forwarding operation may include receiving a first signal 440, performing one or more digital processing operations on the first signal 440 to generate a second signal 445, and transmitting the second signal 445. The second signal 445 may be the result of the forwarding node 405 performing a repeating operation to regenerate the first signal 440 (e.g., through the one or more digital processing operations) such that $X' \sim X$, where X is the first signal 440 and X' is the second signal 445. Additionally, or alternatively, the second signal 445 may be the result of the forwarding node 405 performing a relaying operation to generate a new signal that carries information about and/or from the first signal 440 (e.g., through the one or more digital processing operations) such that $Y=f(X)$, where X is the first signal 440 and Y is the second signal 445.

In some aspects, the first signal 440 may include a communication (e.g., the communication 320 shown in FIG. 3) that is transmitted from the control node 410 and addressed to the wireless node 415. In some aspects, as shown, the first signal 440 may be transmitted from the control node 410 and addressed to the wireless node 415. In some aspects, the first signal 440 may be transmitted from the wireless node 415 or the wireless node 420 and addressed to the control node 410, addressed to the other wireless node 415 or wireless node 420, and/or the like. In some aspects, the first signal 440 may be addressed to a plurality of wireless nodes (e.g., wireless node 415, wireless node 420, control node 410, and/or the like). In some aspects, the first signal 440 may include an SSB communication, information associated with an SSB communication, a physical downlink control channel (PDCCH) transmission, a PDSCH transmission, a physical uplink control channel (PUCCH) transmission, a PUSCH transmission, a physical sidelink channel (PSSCH) transmission, an acknowledgement or negative acknowledgement (ACK/NACK) feedback message, and/or the like.

In some aspects, the forwarding component 430 may perform the one or more forwarding operations based at least in part on a configuration established using the control component 425. For example, in some aspects, the control node 410 may transmit configuration information 450 using a control message 455, and the forwarding node 405 may receive the control message 455 using the control component 425.

In some aspects, the control node 410 may transmit the configuration information 450 in the control message 455 via the control interface 435. The configuration information 450 may be carried in at least one control message 455. In some aspects, control messages may be used to control communication between the forwarding node 405 and the control node 410 in accordance with a specification of the control interface 435. In some aspects, the configuration information 450 may be carried in a lower-layer control message (e.g., a control message associated with physical layers and/or medium access control (MAC) layers), an upper-layer control message (e.g., a control message associated with network layers), an application-layer control message (e.g., a control message associated with an application layer), and/or the like. For example, a control message may be carried using a radio resource control (RRC) message, downlink control information (DCI), a MAC control element (MAC-CE), and/or the like.

In some aspects, a control message may be included within the first signal 440. In some aspects, the configuration 450 may be carried in a fronthaul PDCCH (FH-PDCCH) control message. In some aspects, the FH-PDCCH control message may include DCI scrambled by a fronthaul radio network temporary identifier (FH-RNTI). The FH-RNTI may be associated with the control component 425.

In some aspects, the control message 455 may configure any number of different types of settings, configurations, digital processing operations, receiving operations, buffering operations, forwarding (transmitting) operations, and/or the like. In some aspects, the forwarding node 405 may transmit, and the control node 410 may receive, one or more control messages. For example, in some aspects, the forwarding node 405 may, using the control component 425, transmit a control message via the control interface 435 to the control node 410. The control message transmitted by the forwarding node 405 may indicate a configuration, a capability, a status, and/or other information related to the forwarding node 405.

As indicated above, in some aspects, the control node 410 may configure the forwarding node 405 for a particular forwarding (e.g., repeating and/or relaying) operation by transmitting configuration information 450 to the forwarding node 405. In some aspects, the configuration information 450 may indicate a digital processing operation. The digital processing operation may include a digital processing option selected from a plurality of digital processing options (e.g., as described below in connection with FIG. 5 and FIGS. 6A-6B). In some aspects, the configuration information 450 may include one or more information elements (IEs) that indicate a reception configuration, a buffering configuration, a forwarding configuration, an information request, and/or the like.

In some aspects, the reception configuration may configure one or more receiving operations of the forwarding component 430 with respect to receiving the first signal 440. The reception configuration may indicate, for example, a receiving analog beamforming configuration, a time domain resource associated with the first signal 440, a frequency domain resource associated with the first signal 440, a numerology associated with the first signal 440, a digital receiver beamforming configuration, resource element (RE) mapping information associated with the first signal 440, a channel estimation configuration, a scrambling identifier associated with the first signal 440, a coding configuration associated with the first signal 440, and/or the like.

In some aspects, the buffering configuration may configure one or more buffering operations of the forwarding component 430 with respect to buffering a digitized form of the first signal 440. In some aspects, the buffering configuration may indicate an analog-to-digital converter (ADC) setting, a digital-to-analog converter (DAC) setting, an IQ sample compression setting, an IQ sample decompression setting, and/or the like.

In some aspects, the forwarding configuration may configure one or more forwarding operations of the forwarding component 430 with respect to transmitting the second signal 445, which may be a regenerated form of the first signal 440 or a new signal that carries information about and/or from the first signal 440. In some aspects, the forwarding configuration may include a transmission beamforming configuration, a time domain resource associated with transmitting the second signal, a transmission power setting, a transmission amplification setting, a transmission center frequency, a numerology associated with transmitting the second signal, a digital transmitter beamforming configuration, RE mapping information associated with transmitting the second signal, a layer mapping configuration, a precoding configuration, a scrambling identifier associated with transmitting the second signal, a coding configuration associated with transmitting the second signal, and/or the like.

In some aspects, the information request may configure one or more reporting operations of the forwarding component 430 with respect to providing information to the control node 410. The information may include information about the operation of the forwarding node 405, the configuration of the forwarding node 405, settings of the forwarding node 405, a channel, a communication, and/or the like. In some aspects, the information request may include a request for a buffer status, a power status, a measurement report, a capability of the digital repeater, a configuration of the forwarding node 405, and/or the like.

As indicated above, FIG. 4 is provided as an example. Other examples may differ from what is described with respect to FIG. 4.

Figure 5:
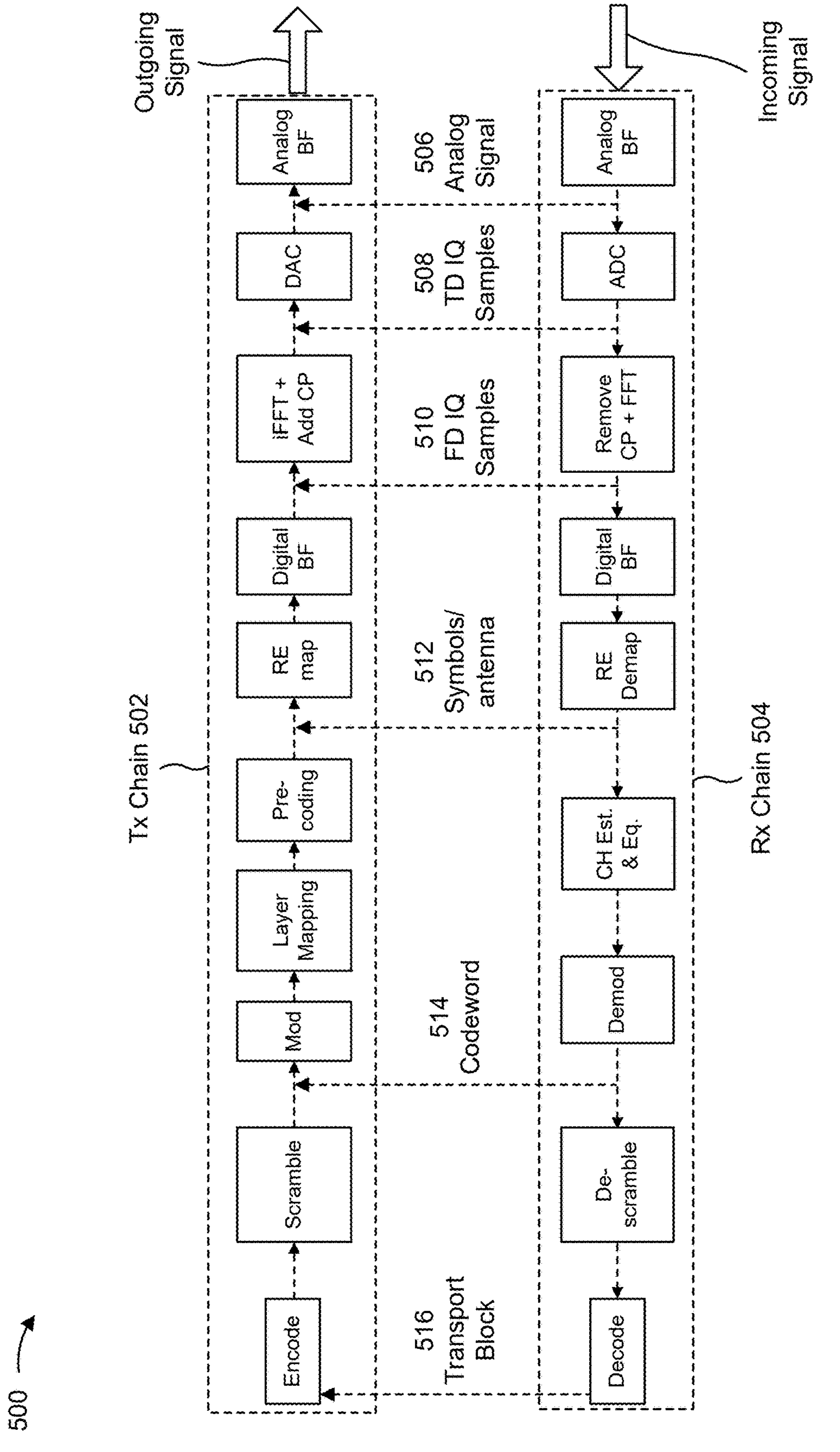
FIG. 5 is a diagram illustrating an example of a transmit (Tx) chain and a receive (Rx) chain of a forwarding node implemented as a repeater node, in accordance with the present disclosure.

FIG. 5 is a diagram illustrating an example 500 of a transmit (Tx) chain 502 and a receive (Rx) chain 504 of a forwarding node implemented as a repeater node, in accordance with the present disclosure.

In some aspects, one or more components of Tx chain 502 may be implemented in transmit processor 220, TX MIMO processor 230, MOD/DEMOD 232, controller/processor 240, and/or the like, as described above in connection with FIG. 2. In some aspects, Tx chain 502 may be implemented in a repeater node for transmitting an outgoing signal (e.g., uplink data, downlink data, an uplink reference signal, a downlink reference signal, uplink control information, downlink control information, and/or the like) associated with a repeating operation performed by the repeater node.

In some aspects, one or more components of Rx chain 504 may be implemented in receive processor 238, MIMO detector 236, MOD/DEMOD 232, controller/processor 240, and/or the like, as described above in connection with FIG.

2. In some aspects, Rx chain 504 may be implemented in a repeater node for receiving an incoming signal (e.g., downlink data, uplink data, a downlink reference signal, an uplink reference signal, downlink control information, uplink control information, and/or the like) associated with a repeating operation performed by the repeater node.

As shown in FIG. 5 and example 500, the incoming signal may be a downlink signal that is received over a fronthaul link from a distributed unit (DU) of an IAB node, a base station 110, and/or the like, and the outgoing signal may be a regenerated version of the downlink signal that is transmitted over an access link to a mobile termination (MT) unit of an IAB node, a UE 120, and/or the like. Additionally, or alternatively, the incoming signal may be an uplink signal that is received over an access link from an MT unit of an IAB node, a UE 120, and/or the like, and the outgoing signal may be a regenerated version of the uplink signal that is transmitted over a fronthaul link to a DU of an IAB node, a base station 110, and/or the like. Accordingly, as described herein, repeating operations performed by the repeater node may be symmetric for downlink and uplink signals. Furthermore, in some aspects, the device transmitting the incoming signal and/or the device receiving the outgoing signal may be unaware of the repeater node (e.g., the repeating operations may be transparent to the transmitting device and/or the receiving device).

As shown in FIG. 5, the incoming signal may be processed by the Rx chain 504. For example, as described herein, the repeater node may perform different levels of analog and/or digital processing to regenerate the incoming signal as the outgoing signal. The level of processing performed by the repeater node may be based at least in part on a configuration received by the repeater node (e.g., from a control node and/or the like). For example, as shown by reference number 506 (which shows what may be referred to as Split Option 9), the repeater node may perform analog beamforming on the incoming signal, and may provide an analog signal to the Tx chain 502. The repeater node may then perform analog beamforming on the analog signal to transmit the outgoing signal to the receiving device. In this case, the repeater node may be configured as an analog repeater.

Additionally, or alternatively, the repeater node may be configured as a digital repeater, in which case the repeater node may further process the incoming signal. For example, as shown by reference number 508 (which shows what may be referred to as Split Option 8), the repeater node may process the analog signal by converting the incoming signal from the analog domain to the digital domain using an analog-to-digital converter (ADC) to determine time domain IQ samples associated with the incoming signal. Accordingly, in some aspects, the repeater node may process the time domain IQ samples using a digital-to-analog converter (DAC) to regenerate the analog signal, which is then transmitted using analog beamforming.

Additionally, or alternatively, as shown by reference number 510 (which shows what may be referred to as Split Option 7-1), the repeater node may further process the incoming signal to determine frequency domain IQ samples associated with the incoming signal by removing a cyclic prefix (CP) from the time domain IQ samples and performing a fast Fourier transform (FFT). In this case, the repeater node may generate the outgoing signal by then performing an inverse FFT (iFFT) on the frequency domain IQ samples and adding a CP to obtain time domain IQ samples, converting the time domain IQ samples to an analog signal using a DAC, and transmitting the analog signal using analog beamforming.

Additionally, or alternatively, as shown by reference number 512 (which shows what may be referred to as Split Option 7-2), the repeater node may further process the incoming signal to determine symbols per antenna (e.g., IQ symbols of occupied tones) associated with the incoming signal. For example, the repeater node may perform a digital beamforming process on the frequency domain IQ samples (e.g., based at least in part on a digital Tx beamforming configuration), and may further perform a resource element (RE) demapping based at least in part on an RE mapping configuration received by the repeater node to identify REs of the incoming signal and/or occupied tones. The repeater node may generate the outgoing signal by processing the symbols per antenna (e.g., IQ symbols of occupied tones) using an RE mapping and digital beamforming information.

Additionally, or alternatively, as shown by reference number 514 (which shows what may be referred to as Split Option 7-3), the repeater node may further process the incoming signal to determine a codeword (e.g., log likelihood ratio (LLR) values and/or the like) associated with the incoming signal. For example, the repeater node may determine the codeword by performing channel estimation and channel equalization on the IQ symbols of occupied tones (e.g., to identify and/or remove noise associated with the incoming signal) and by performing a demodulation procedure on the incoming signal. In this case, the repeater node may generate the outgoing signal by modulating the codeword, performing a layer mapping, applying pre-coding, performing an RE mapping, performing digital Tx beamforming, applying an iFFT and/or adding a CP, converting the signal from the digital domain to the analog domain using a DAC, and performing analog beamforming to transmit the outgoing signal.

Additionally, or alternatively, as shown by reference number 516 (which shows what may be referred to as Split Option 6), the repeater node may further process the incoming signal to obtain a transport block associated with the incoming signal (e.g., the repeater node may fully decode the incoming signal). For example, the repeater node may obtain the transport block by descrambling the codeword (e.g., using a scrambling identifier associated with the incoming signal) and decoding the descrambled codeword (e.g., based at least in part on an MCS associated with the incoming signal). In this case, the repeater node may generate the outgoing signal by encoding the transport block according to a Tx MCS, scrambling the encoded transport block to regenerate the codeword, modulating the codeword and performing a layer mapping and pre-coding to regenerate the symbols per antenna, performing an RE mapping and digital Tx beamforming to regenerate the frequency domain IQ samples, applying an iFFT and/or adding a CP to the frequency domain IQ samples to regenerate the time domain IQ samples, converting the time domain IQ samples from the digital domain to the analog domain with a DAC, and performing analog beamforming on the analog signal in the analog domain to transmit the outgoing signal.

In some aspects, the level of processing that the repeater node performs on the incoming signal may be configured by a control node or another wireless node. The outgoing signal may be a regenerated version of the incoming signal that is based at least in part on the level of processing performed by the repeater node.

The quantity and arrangement of components shown in FIG. 5 is provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

Figure 6A:
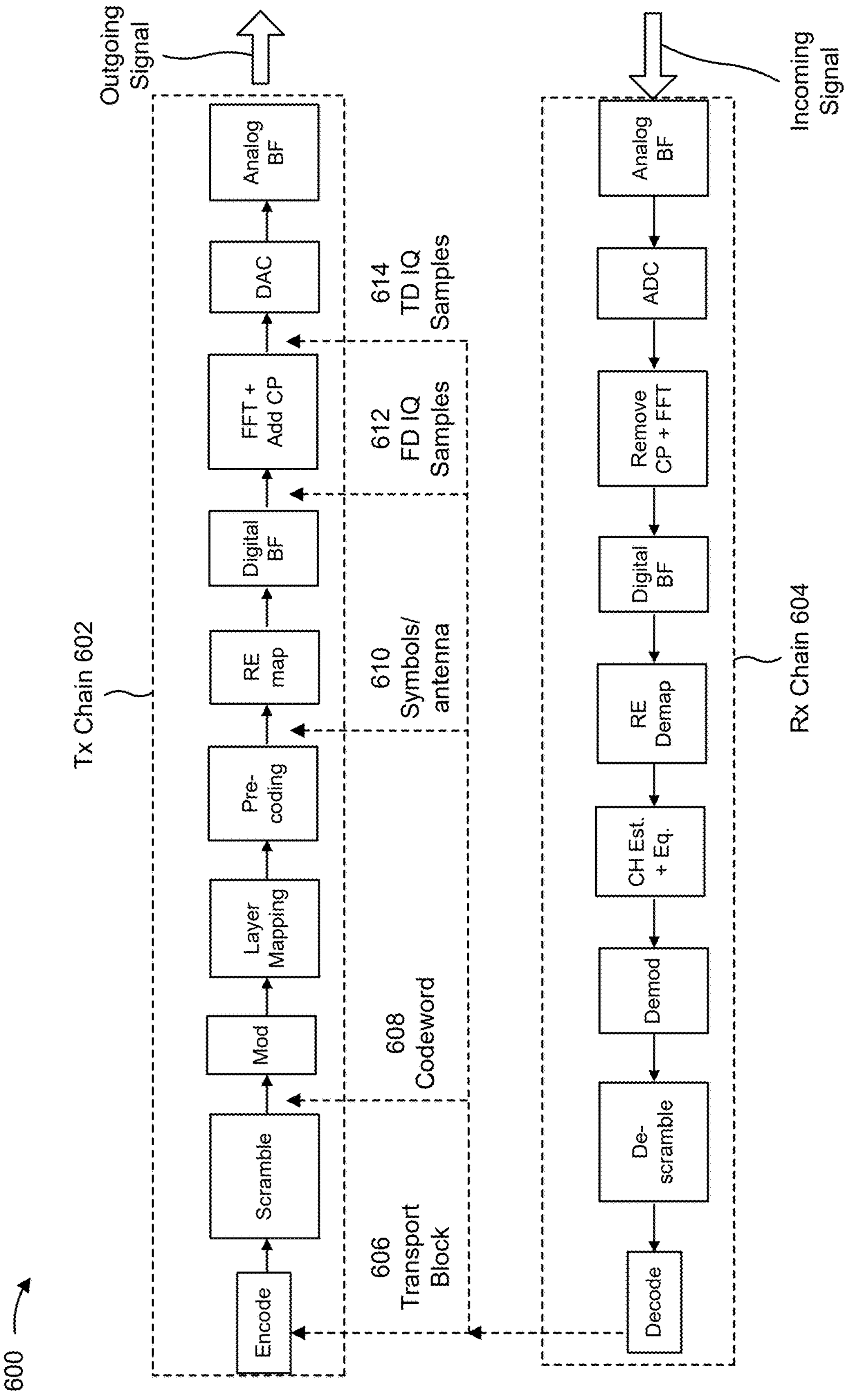
FIGS. 6A-6B are diagrams illustrating examples of a Tx chain and an Rx chain of a forwarding node implemented as a relay node, in accordance with the present disclosure.
Figure 6B:
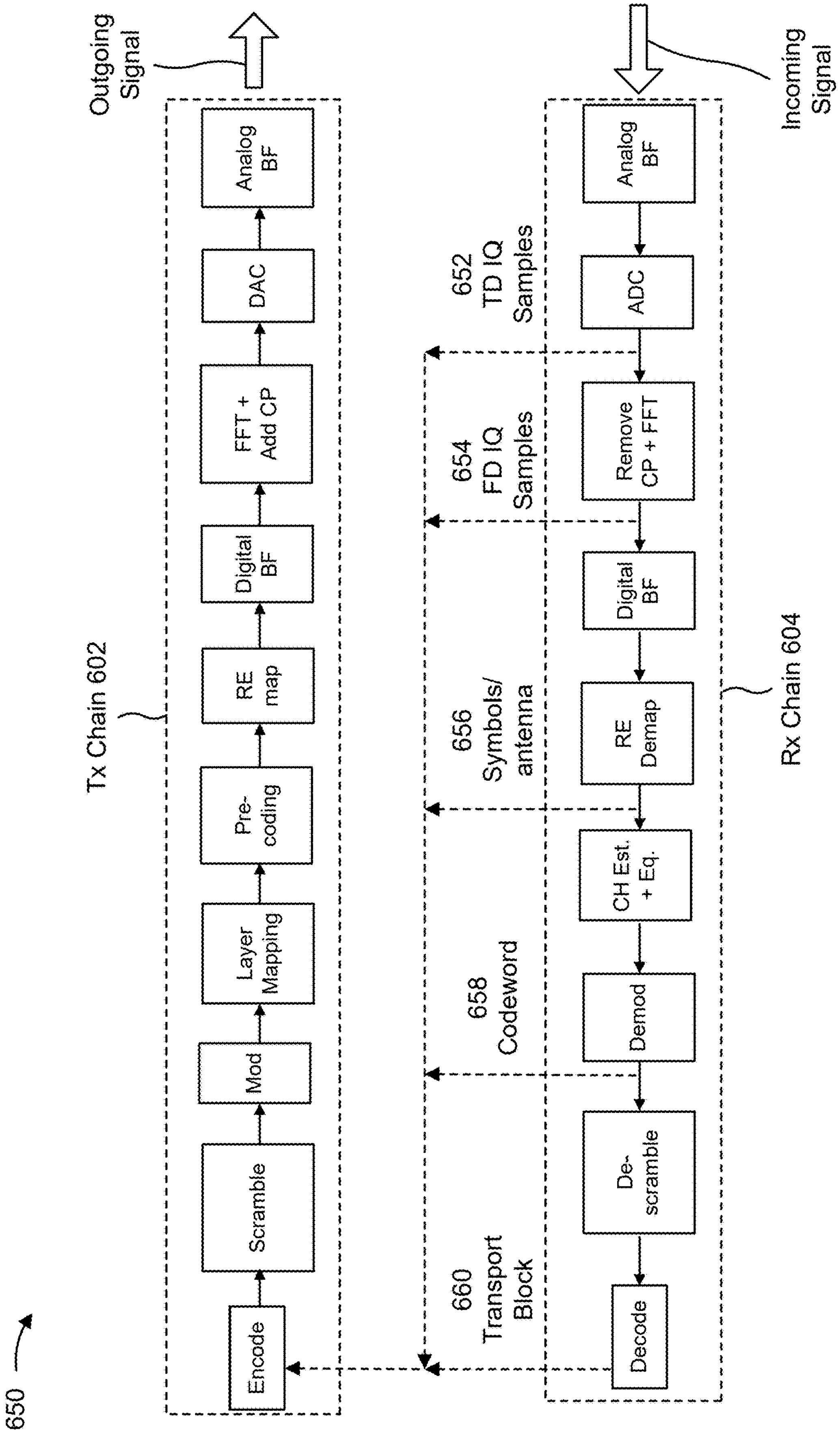

FIGS. 6A-6B are diagrams illustrating examples 600 and 650 of a Tx chain 602 and an Rx chain 604 of a forwarding node implemented as a relay node, in accordance with the present disclosure.

In some aspects, one or more components of Tx chain 602 may be implemented in transmit processor 220, TX MIMO processor 230, MOD/DEMOD 232, controller/processor 240, and/or the like, as described above in connection with FIG. 2. In some aspects, Tx chain 602 may be implemented in a relay node for transmitting an outgoing signal (e.g., uplink data, downlink data, an uplink reference signal, a downlink reference signal, uplink control information, downlink control information, and/or the like) associated with a relaying operation performed by the relay node.

In some aspects, one or more components of Rx chain 604 may be implemented in receive processor 238, MIMO detector 236, MOD/DEMOD 232, controller/processor 240, and/or the like, as described above in connection with FIG. 2. In some aspects, Rx chain 604 may be implemented in a relay node for receiving an incoming signal (e.g., downlink data, uplink data, a downlink reference signal, an uplink reference signal, downlink control information, uplink control information, and/or the like) associated with a relaying operation performed by the relay node.

As shown in FIG. 6A and example 600, the incoming signal may be received by the relay node over a fronthaul link. For example, the incoming signal may be a downlink signal received from a DU of an IAB node, a base station 110, and/or the like. As shown in FIG. 6A, the incoming signal may be processed by the Rx chain 604. For example, the relay node may fully decode the incoming signal to obtain information (e.g., a payload) carried in the incoming signal. The relay node may perform analog beamforming on the incoming signal. The relay node may convert the incoming signal from the analog domain to the digital domain using an ADC. The relay node may remove a CP and/or an FFT associated with the incoming signal. The relay node may perform a digital beamforming process on the incoming signal (e.g., based at least in part on a digital Tx beamforming configuration). The relay node may perform an RE de-mapping procedure based at least in part on an RE mapping configuration received by the relay node to identify REs of the signal and/or occupied tones. The relay node may perform channel estimation and channel equalization on the incoming signal (e.g., to identify and/or remove noise associated with the incoming signal). The relay node may perform a demodulation procedure on the incoming signal. The relay node may de-scramble the incoming signal (e.g., using scrambling IDs associated with the incoming signal). The relay node may decode the incoming signal (e.g., based at least in part on an MCS associated with the incoming signal).

After decoding the incoming signal, the relay node may identify information carried by the incoming signal. For example, a payload of the incoming signal may include time domain IQ samples, frequency domain IQ samples, symbols per antenna (e.g., IQ symbols of occupied tones), a codeword, a transport block, and/or the like. The relay node may generate an outgoing signal using the Tx chain 602. An amount or level of processing performed by the relay node associated with the Tx chain 602 may be based at least in part on the information carried by the incoming signal, a configuration received by the relay node (e.g., from a control node and/or the like), and/or the like.

As shown by reference number 606 (which shows Split Option 6), if the incoming signal is carrying a transport block, the relay node may generate the outgoing signal by fully encoding the transport block to form the outgoing signal (e.g., by encoding the transport block according to a Tx MCS, scrambling the encoded transport block, modulating the scrambled transport block, performing layer mapping, pre-coding, performing digital Rx beamforming, applying an FFT and/or adding a CP, converting the signal from the digital domain to the analog domain with a DAC, performing analog beamforming, and transmitting the outgoing signal).

As shown by reference number 608 (which shows Split Option 7-3), if the incoming signal is carrying a codeword, the relay node may not perform encoding or scrambling to generate the outgoing signal. That is, the relay node may modulate the codeword, perform layer mapping, perform pre-coding, perform digital Tx beamforming, apply an FFT and/or add a CP, convert the signal from the digital domain to the analog domain with a DAC, perform analog beamforming, and transmit the outgoing signal.

As shown by reference number 610 (which shows Split Option 7-2), if the incoming signal is carrying an indication of symbols per antenna (e.g., IQ symbols of occupied tones), the relay node may not perform encoding, scrambling, modulating, layer mapping, and/or pre-coding. That is, the relay node may perform digital Rx beamforming to the IQ symbols of occupied tones, apply an FFT and/or add a CP, convert the signal from the digital domain to the analog domain with a DAC, perform analog beamforming, and transmit the outgoing signal.

As shown by reference number 612 (which shows Split Option 7-1), if the incoming signal is carrying frequency domain IQ samples, the relay node may not perform encoding, scrambling, modulating, layer mapping, pre-coding, and/or digital beamforming. That is, the relay node may apply an FFT and/or add a CP to the frequency domain IQ samples, convert the signal from the digital domain to the analog domain with a DAC, perform analog beamforming, and transmit the outgoing signal.

As shown by reference number 614 (which shows Split Option 8), if the incoming signal is carrying time domain IQ samples, the relay node may not perform encoding, scrambling, modulating, layer mapping, pre-coding, digital beamforming, and/or applying an FFT and/or adding a CP. That is, the relay node may convert the time domain IQ samples from the digital domain to the analog domain with a DAC, perform analog beamforming, and transmit the outgoing signal.

As a result, the level of digital processing used to generate the outgoing signal may vary based at least in part on information carried by the incoming signal. As described above, the relay node may process the incoming signal to identify information included in a payload of the incoming signal. The relay node may generate an outgoing signal that includes information about and/or from the incoming signal based at least in part on the information carried by the incoming signal. In some aspects, a device receiving the outgoing signal may be unaware of the relay node (e.g., the relaying operations may be transparent to the receiving device).

As shown in FIG. 6B and example 650, the incoming signal may be received by the relay node over an access link. For example, the incoming signal may be an uplink signal received from an MT unit of an IAB node, a UE 120, and/or the like. In some aspects, the device transmitting the incoming signal may be unaware of the relay node (e.g., the relaying operations may be transparent to the transmitting device).

The relay node may perform different levels of digital processing to determine information associated with the incoming signal. The level of processing may be based at least in part on a configuration received by the relay node (e.g., from a control node and/or the like). For example, as shown by reference number 652 (which shows Split Option 8), the relay node may process the incoming signal to determine time domain IQ samples associated with the incoming signal. The relay node may generate the outgoing signal by processing the time domain IQ samples and including them in a payload of the outgoing signal (e.g., by fully encoding a transport block indicating the time domain IQ samples). The outgoing signal may be transmitted using a fronthaul link to another wireless node.

As shown by reference number 654 (which shows Split Option 7-1), the relay node may process the incoming signal to determine frequency domain IQ samples associated with the incoming signal. The relay node may generate the outgoing signal by processing the frequency domain IQ samples and including them in a payload of the outgoing signal (e.g., by fully encoding a transport block indicating the frequency domain IQ samples). The outgoing signal may be transmitted using a fronthaul link to another wireless node.

As shown by reference number 656 (which shows Split Option 7-2), the relay node may process the incoming signal to determine symbols per antenna (e.g., IQ symbols of occupied tones) associated with the incoming signal. The relay node may generate the outgoing signal by processing the symbols per antenna (e.g., IQ symbols of occupied tones) and including them in a payload of the outgoing signal (e.g., by fully encoding a transport block indicating the symbols per antenna (e.g., IQ symbols of occupied tones)). The outgoing signal may be transmitted using a fronthaul link to another wireless node.

As shown by reference number 658 (which shows Split Option 7-3), the relay node may process the incoming signal to determine a received codeword (e.g., LLR values and/or the like) associated with the incoming signal. The relay node may generate the outgoing signal by processing the received codeword and including it in a payload of the outgoing signal (e.g., by fully encoding a transport block indicating the received codeword). The outgoing signal may be transmitted using a fronthaul link to another wireless node.

As shown by reference number 660 (which shows Split Option 8), the relay node may process the incoming signal to determine a transport block associated with the incoming signal (e.g., the relay node may fully decode the incoming signal). The relay node may generate the outgoing signal by processing the transport block and including the transport block in a payload of the outgoing signal (e.g., by fully encoding a transport block). The outgoing signal may be transmitted using a fronthaul link to another wireless node.

The level of processing performed on the incoming signal may be configured by a control node or another wireless node. The outgoing signal may include information about and/or from the incoming signal based at least in part on the level of processing performed by the relay node.

The quantity and arrangement of components shown in FIGS. 6A-6B are provided as an example. In practice, there may be additional components, fewer components, different components, or differently arranged components than those shown in FIGS. 6A-6B. Furthermore, two or more components shown in FIGS. 6A-6B may be implemented within a single component, or a single component shown in FIGS. 6A-6B may be implemented as multiple, distributed components. Additionally, or alternatively, a set of components (e.g., one or more components) shown in FIGS. 6A-6B may perform one or more functions described as being performed by another set of components shown in FIGS. 6A-6B.

Figure 7:
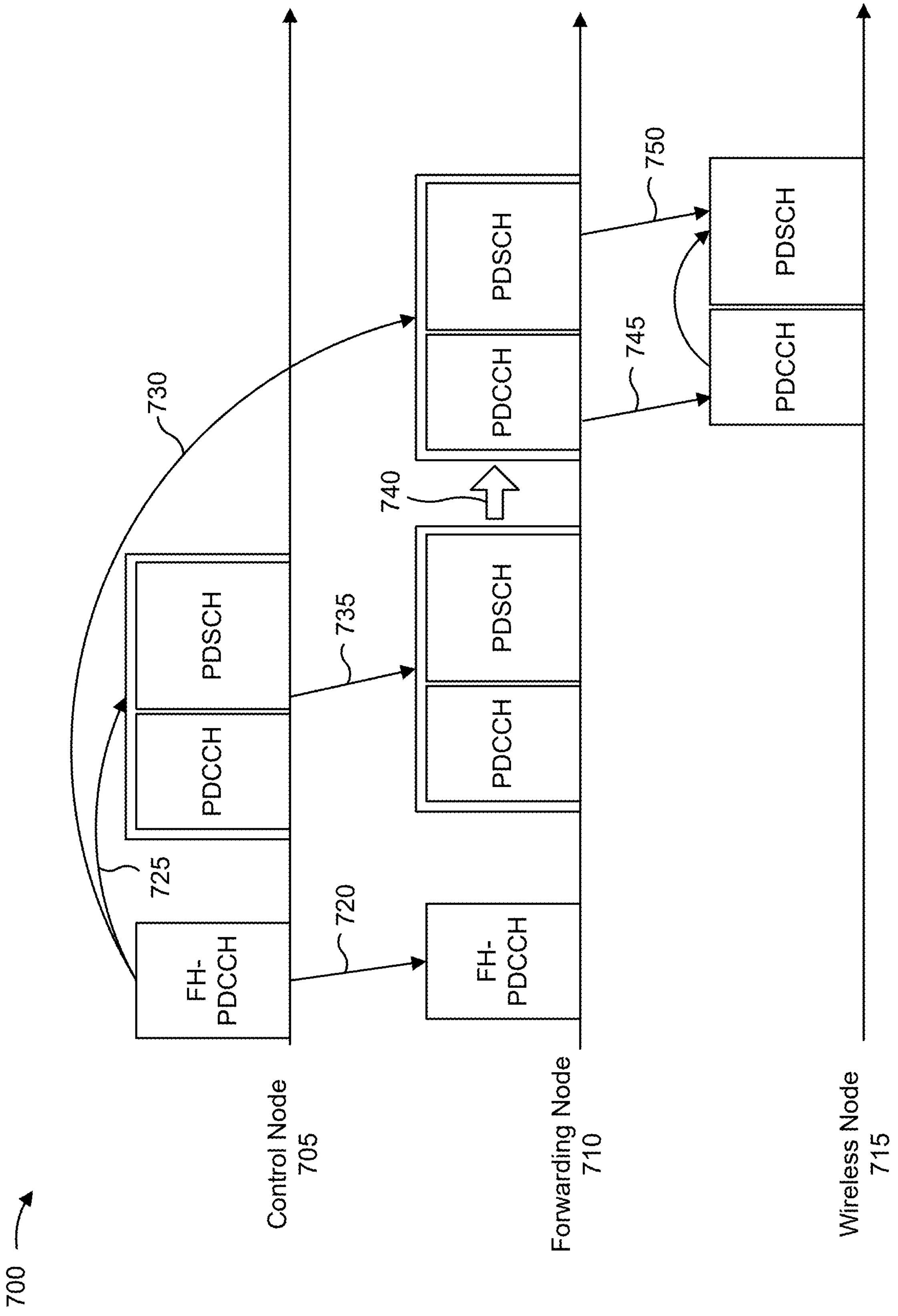
FIG. 7 is a diagram illustrating an example of forwarding a wireless signal using a forwarding node, in accordance with the present disclosure.

FIG. 7 is a diagram illustrating an example 700 of forwarding a wireless signal using a forwarding node 710, in accordance with the present disclosure. In some aspects, the forwarding node 710 may be a repeater node (or repeater unit) configured to receive an incoming signal and to transmit a regenerated version of the incoming signal (e.g., using techniques describe in further detail above with reference to FIG. 5). Additionally, or alternatively, the forwarding node 710 may be a relay node (or relay unit) configured to receive an incoming signal and to transmit an outgoing signal that includes information about and/or from the incoming signal (e.g., using techniques describe in further detail above with reference to FIGS. 6A-6B).

As shown in FIG. 7, the forwarding node 710 may receive one or more downlink communications from a control node 705 (e.g., a DU of an IAB node, a base station 110, and/or the like) over a fronthaul link, and may forward one or more of the downlink communications to a wireless node 715 (e.g., an MT unit of an IAB node, a UE 120, and/or the like) over an access link. In this case, example 700 illustrates downlink control and data forwarding operations associated with the forwarding node 710. However, it will be appreciated that similar techniques as shown in FIG. 7 may be applied for uplink control and data forwarding operations.

As shown in FIG. 7, the control node 705 may determine that the control node 705 is to send one or more downlink communications (e.g., an SSB, a PDSCH, a PDCCH scheduling transmission of the PDSCH, and/or the like) to the wireless node 715. However, the control node 705 may determine that the wireless node 715 is outside a communication range of the control node 705. Therefore, the control node 705 may utilize the forwarding node 710 to transmit the one or more downlink communications to the wireless node 715.

As shown by reference number 720, the control node 705 may transmit a fronthaul PDCCH (FH-PDCCH) communication to the forwarding node 710. The FH-PDCCH communication may be a control message (e.g., the control message 455 shown in FIG. 4). As shown by reference number 725, the FH-PDCCH communication may schedule a PDSCH communication (e.g., an access link PDSCH communication) and/or a PDCCH communication (e.g., an FH-PDCCH, an access link PDCCH, and/or the like) that is to be transmitted to the forwarding node 710. As shown by reference number 730, the FH-PDCCH communication may include a configuration (e.g., the configuration information 450 shown in FIG. 4) that configures the forwarding node 710 to forward the PDSCH communication and/or the PDCCH communication that is to be transmitted to wireless node 715. In some aspects, more than one FH-PDCCH communication may be used to configure the forwarding node 710.

As shown by reference number 735, the control node 705 may transmit, to the forwarding node 710, the PDSCH communication and/or the PDCCH communication scheduled by the PDCCH communication shown by reference number 720. As shown by reference number 740, the forwarding node 710 may generate a PDCCH communication and/or a PDSCH communication based at least in part on receiving the PDSCH communication from the control node. In some aspects, the forwarding node 710 may generate the PDCCH communication and/or the PDSCH communication based at least in part on a digital processing operation configured by the configuration shown by reference number 730. In some aspects, the generated PDCCH communication may schedule the generated PDSCH communication to be transmitted from the forwarding node 710 to the wireless node 715.

As shown by reference number 745, the forwarding node 710 may transmit the generated PDCCH communication that schedules the generated PDSCH communication to the wireless node 715. As shown by reference number 750, the forwarding node 710 may transmit the generated PDSCH communication to the wireless node 715. The forwarding node 710 may transmit the generated PDCCH communication and the generated PDSCH communication to the wireless node 715 using an access link.

In some aspects, the configuration also may configure, using the FH-PDCCH communication and/or one or more other FH-PDCCH communications, a repeating and/or relaying operation (e.g., a digital processing operation, time domain resources, frequency domain resources, and/or the like) for an ACK/NACK feedback message that may be transmitted by the wireless node 715 and addressed to the control node 705. In some aspects, the configuration may configure one or more repeating and/or relaying operations (e.g., a digital processing operation, time domain resources, frequency domain resources, and/or the like) associated with future uplink transmissions that may be transmitted from the wireless node 715 and addressed to the control node 705. In some aspects, the repeating and/or relaying operation configurations may include configuring semi-static uplink control resources that may be used by the wireless node 715 to transmit control messages, such as scheduling requests.

As indicated above, FIG. 7 is provided as an example. Other examples may differ from what is described with respect to FIG. 7.

Figure 8A:
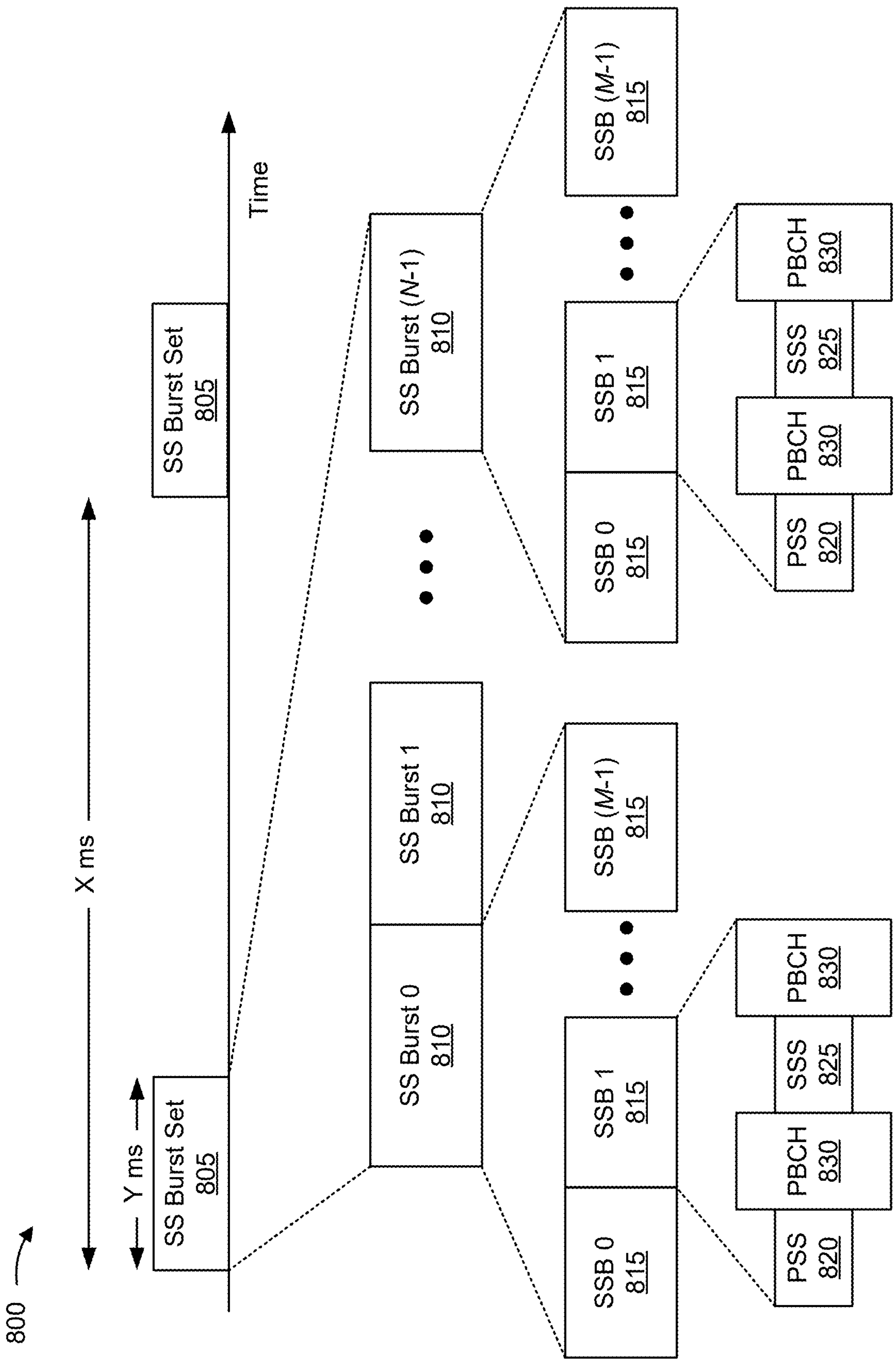
FIG. 8A is a diagram illustrating an example of a synchronization signal hierarchy, in accordance with the present disclosure.

FIG. 8A is a diagram illustrating an example 800 of a synchronization signal (SS) hierarchy, in accordance with the present disclosure. As shown in FIG. 8A, the SS hierarchy may include an SS burst set 805, which may include multiple SS bursts 810, shown as SS burst 0 through SS burst N-1, where N is a maximum number of repetitions of the SS burst 810 that may be transmitted by the base station. As further shown, each SS burst 810 may include one or more SS blocks (SSBs) 815, shown as SSB 0 through SSB M-1, where M is a maximum number of SSBs 815 that can be carried by an SS burst 810. In some aspects, different SSBs 815 may be beam-formed differently (e.g., transmitted using different beams), and may be used for cell search, cell acquisition, beam management, beam selection, and/or the like (e.g., as part of an initial network access procedure). An SS burst set 805 may be periodically transmitted by a wireless node (e.g., base station 110), such as every X milliseconds, as shown in FIG. 8A. In some aspects, an SS burst set 805 may have a fixed or dynamic length, shown as Y milliseconds in FIG. 8. In some cases, an SS burst set 805 or an SS burst 810 may be referred to as a discovery reference signal (DRS) transmission window, an SSB measurement time configuration (SMTC) window, and/or the like.

In some aspects, an SSB 815 may include resources that carry a primary synchronization signal (PSS) 820, a secondary synchronization signal (SSS) 825, a physical broadcast channel (PBCH) 830, and/or the like. In some aspects, multiple SSBs 815 are included in an SS burst 810 (e.g., with transmission on different beams), and the PSS 820, the SSS 825, and/or the PBCH 830 may be the same across each SSB 815 of the SS burst 810. In some aspects, a single SSB 815 may be included in an SS burst 810. In some aspects, the SSB 815 may be at least four symbols (e.g., OFDM symbols) in length, where each symbol carries one or more of the PSS 820 (e.g., occupying one symbol), the SSS 825 (e.g., occupying one symbol), and/or the PBCH 830 (e.g., occupying two symbols). In some aspects, an SSB 815 may be referred to as an SS/PBCH block.

In some aspects, the symbols of an SSB 815 are consecutive, as shown in FIG. 8A. In some aspects, the symbols of an SSB 815 are non-consecutive. Similarly, in some aspects, one or more SSBs 815 of the SS burst 810 may be transmitted in consecutive radio resources (e.g., consecutive symbols) during one or more slots. Additionally, or alternatively, one or more SSBs 815 of the SS burst 810 may be transmitted in non-consecutive radio resources.

In some aspects, the SS bursts 810 may have a burst period, and the SSBs 815 of the SS burst 810 may be transmitted by a wireless node (e.g., base station 110) according to the burst period. In this case, the SSBs 815 may be repeated during each SS burst 810. In some aspects, the SS burst set 805 may have a burst set periodicity, whereby the SS bursts 810 of the SS burst set 805 are transmitted by the wireless node according to the fixed burst set periodicity. In other words, the SS bursts 810 may be repeated during each SS burst set 805.

In some aspects, an SSB 815 may include an SSB index, which may correspond to a beam used to carry the SSB 815. A UE 120 may monitor for and/or measure SSBs 815 using different receive (Rx) beams during an initial network access procedure and/or a cell search procedure, among other examples. Based at least in part on the monitoring and/or measuring, the UE 120 may indicate one or more SSBs 815 with a best signal parameter (e.g., a reference signal received power (RSRP) parameter and/or the like) to a base station 110. The base station 110 and the UE 120 may use the one or more indicated SSBs 815 to select one or more beams to be used for communication between the base station 110 and the UE 120 (e.g., for a random access channel (RACH) procedure and/or the like). Additionally, or alternatively, the UE 120 may use the SSB 815 and/or the SSB index to determine a cell timing for a cell via which the SSB 815 is received (e.g., a serving cell).

As indicated above, FIG. 8A is provided as an example. Other examples may differ from what is described with regard to FIG. 8A.

Figure 8B:
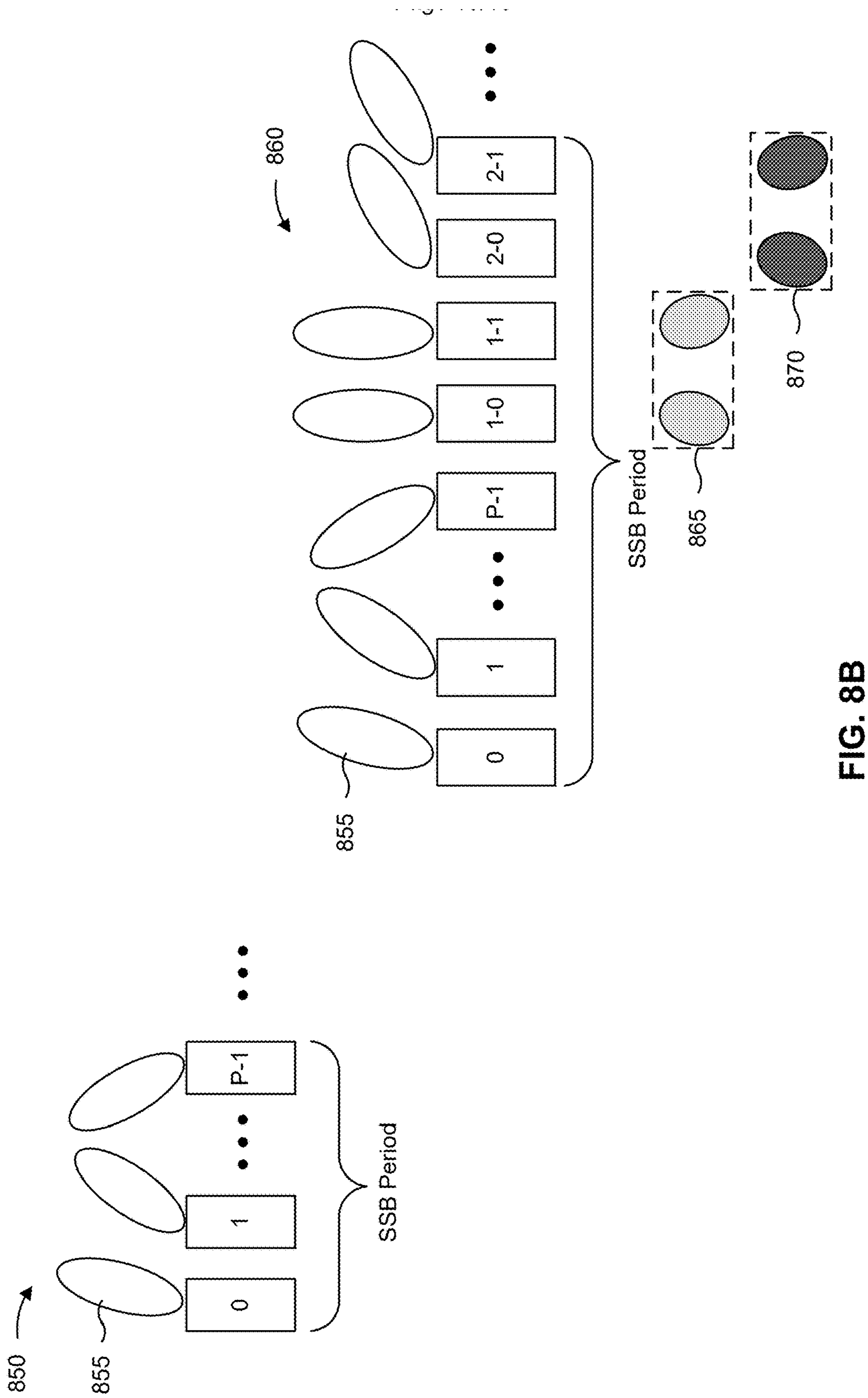
FIG. 8B is a diagram illustrating examples of beam sweeping for an access procedure, in accordance with the present disclosure.

FIG. 8B is a diagram illustrating examples 850 and 860 of beam sweeping for an access procedure, in accordance with the present disclosure. As shown by the example 850, in an access procedure (e.g., an NR initial access procedure), a base station may perform a downlink beam sweep of SSBs (e.g., of an SS burst set, as described above) in an SSB period (e.g., an SS burst set period, as described above). For example, the base station may perform a downlink beam sweep of P SSBs, shown as SSB 0 through SSB P-1. Each SSB of the beam sweep may be transmitted using a respective beam 855 (e.g., in a respective beam direction). For example, a first SSB (SSB 0) may be transmitted using a first beam, a second SSB (SSB 1) may be transmitted using a second beam, and so forth.

As part of the access procedure, the base station may also transmit a remaining minimum system information (RMSI) communication. The RMSI communication may be transmitted in a physical downlink shared channel (PDSCH) scheduled by a physical downlink control channel (PDCCH). The base station may transmit the PDCCH for the RMSI communication in a downlink beam sweep of the beams 855 (and in resources used for transmission of the SSBs of the access procedure).

The RMSI may indicate information used by a UE in performing a random access channel (RACH) procedure. Accordingly, as part of the access procedure, the UE may transmit a RACH communication in one or more RACH occasions in an uplink beam sweep using one or more uplink beams corresponding to the beams 855. A RACH occasion may include the resources associated with an SSB transmission of the access procedure.

As shown by the example 860, in some cases, one or more access procedure communications may be forwarded by one or more analog repeater devices. For example, as shown, SSBs of the access procedure may be forwarded by one or more repeater devices. In the example 860, a base station may perform a downlink beam sweep of SSB 0 through SSB P-1, as described above. In some cases, the base station may transmit one or more SSBs (e.g., in an extended downlink beam sweep) to a repeater device for forwarding to a UE. For example, as shown, the base station may transmit SSBs 1-0 and 1-1 (e.g., one or more SSBs) to a first repeater device using a beam sweep of beams directed at the first repeater device, and the base station may transmit SSBs 2-0 and 2-1 (e.g., one or more SSBs) to a second repeater device using a beam sweep of beams directed at the second repeater device. The first repeater device may receive the SSBs 1-0 and 1-1 and forward the SSBs 1-0 and 1-1 using a downlink beam sweep of beams 865 (e.g., which may use different beam directions than the beams in which the first repeater device received the SSBs from the base station). Similarly, the second repeater device may receive the SSBs 2-0 and 2-1 and forward the SSBs 2-0 and 2-1 using a downlink beam sweep of beams 870.

In some cases, the use of analog repeaters for forwarding SSBs may result in scalability issues. In particular, an analog repeater cannot store information associated with an SSB, and therefore must receive and forward a signal for the SSB in real time (e.g., in a full duplex mode). For example, if a first repeater and a second repeater are to forward SSBs, a base station must transmit multiple SSBs in a direction of the first repeater, and multiple SSBs in a direction of the second repeater. In other words, for each repeater that is to forward SSBs, the base station must perform multiple transmissions of the SSBs. This consumes significant network resources and/or consumes significant computing resources of the base station, among other examples.

Some techniques and apparatuses described herein provide for efficient forwarding of SSBs. In some aspects, a forwarding node may receive, in advance, the SSBs that are to be forwarded by the forwarding node. The forwarding node may store the SSBs for subsequent transmission. That is, the forwarding node may be capable of converting an analog signal into a digital domain for storage. The forwarding node may transmit the SSBs based at least in part on the stored SSBs. For example, the forwarding node may regenerate the SSBs based at least in part on the stored SSBs. In some aspects, the forwarding node may forward the SSBs in parallel with SSBs transmitted by a base station. For example, the forwarding node may forward the SSBs in a same SSB period in which the base station transmits SSBs. In this way, SSB transmission at the base station may be reduced, thereby conserving network resources and/or conserving computing resources at the base station, among other examples.

As indicated above, FIG. 8B is provided as an example. Other examples may differ from what is described with regard to FIG. 8B.

Figure 9:
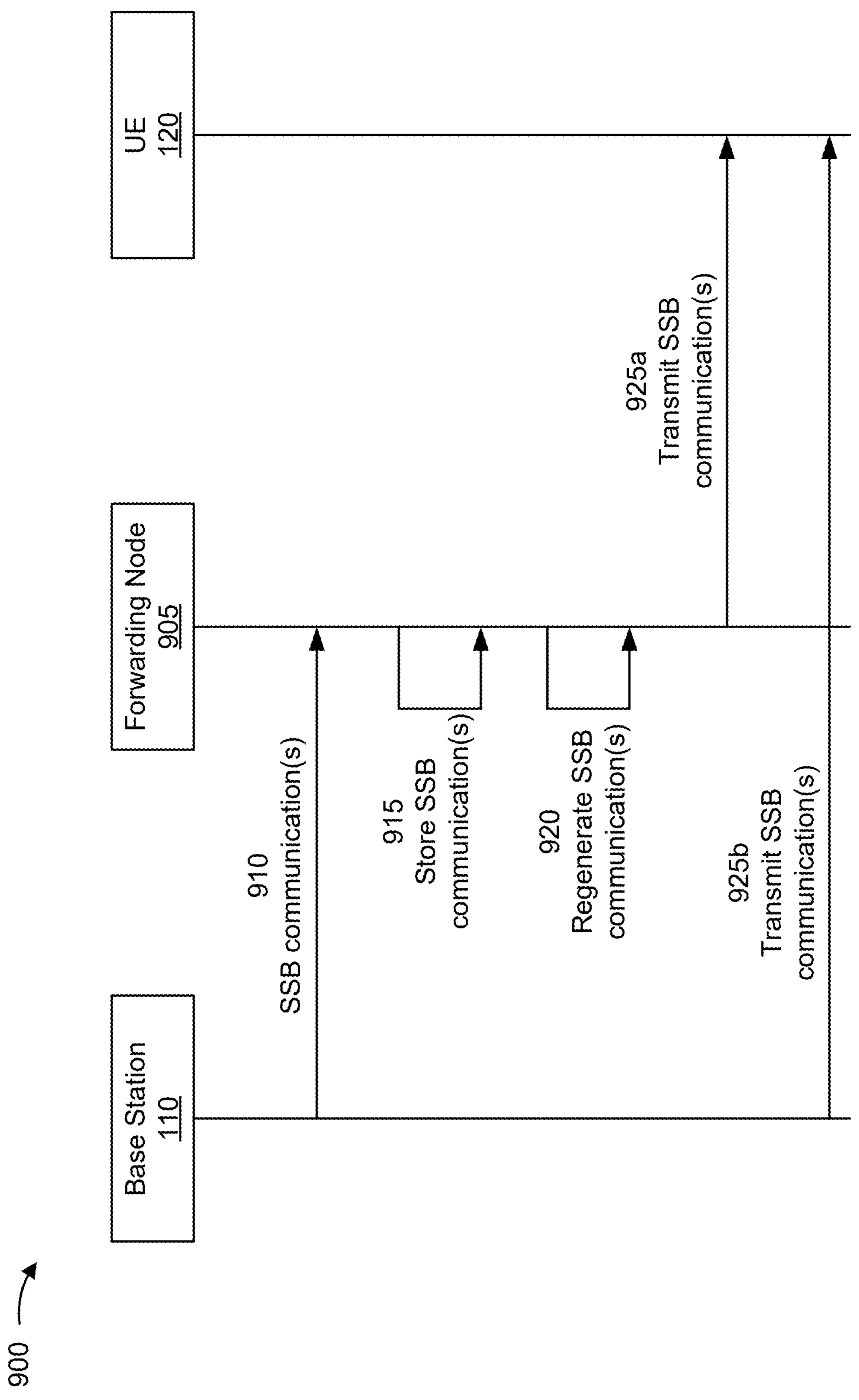
FIG. 9 is a diagram illustrating an example associated with synchronization signal block (SSB) forwarding, in accordance with the present disclosure.

FIG. 9 is a diagram illustrating an example 900 associated with SSB forwarding, in accordance with the present disclosure. As shown in FIG. 9, example 900 includes communication between a base station 110, a forwarding node 905, and a UE 120. In some aspects, the base station 110, the forwarding node 905, and the UE 120 may be included in a wireless network, such as wireless network 100. In some aspects, the forwarding node 905 (which may be referred to as a repeater and/or relay unit (RU)) may be a wireless node, a base station, a UE, and/or an IAB node, among other examples. In some aspects, the forwarding node 905 is a repeater node (e.g., a layer 1 (L1) repeater node). For example, the forwarding node 905 may be a digital repeater node. As described above, a digital repeater node may be capable of converting an analog signal into a digital domain (e.g., for storage at the digital repeater node).

In some aspects, the base station 110 may be a wireless node, an IAB donor node, and/or an IAB node, among other examples. In some aspects, the base station 110 is a control node. In some aspects, the UE 120 may be a wireless node and/or an IAB node, among other examples. In some aspects, the base station 110 may be a parent forwarding node of the forwarding node 905 and/or the UE 120 may be a child forwarding node of the forwarding node 905.

In some aspects, the forwarding node 905 may be configured with one or more of a reception configuration, a buffering configuration, or a forwarding configuration, as described above, for use in receiving and forwarding SSB communications. In some aspects, the forwarding node 905 may be configured with a multiplexing configuration for multiplexing received or generated SSB communications. In some aspects, a configuration for the forwarding node 905 may indicate time and frequency resources, and a beamforming configuration, for reception. In some aspects, a configuration for the forwarding node 905 may indicate time and frequency resources, and a beamforming configuration, for transmission. In some aspects, a configuration for the forwarding node 905 may indicate information and/or parameters for the regeneration of communications (e.g., SSB communications). In some aspects, the base station 110, or another control node, may configure the forwarding node 905 with one or more of the aforementioned configurations.

As shown by reference number 910, the base station 110 may transmit, and the forwarding node 905 may receive, one or more SSB communications (e.g., an SSB or a part thereof, such as a PSS, an SSS, a PBCH, and/or a DMRS) for forwarding by the forwarding node 905. The base station 110 may transmit the one or more SSB communications in an FH-PDSCH.

The base station 110 may transmit the one or more SSB communications in resources (e.g., frequency resources) that are not used for SSB transmissions of the base station 110. For example, the base station 110 may transmit the one or more SSB communications in resources that are not in a synchronization (sync) raster (e.g., in off-sync raster resources). This may prevent UEs, or other child nodes of the base station 110, from confusing the one or more SSB communications, transmitted to the forwarding node 905 for forwarding, with actual SSB transmissions of the base station 110.

The one or more SSB communications may be for transmission by the forwarding node 905 in an SSB period in which the base station 110 is also transmitting SSBs. In some aspects, the forwarding node 905 may receive the one or more SSB communications in a time interval that is prior to the SSB period in which the forwarding node 905 is to transmit the one or more SSB communications. For example, the forwarding node 905 may receive the one or more SSB communications in a first time interval (e.g., a mini-slot, a slot, a subframe, or a frame, among other examples), and the one or more SSB communications may be for transmission by the forwarding node 905 in a second (e.g., subsequent) time interval. As another example, the forwarding node 905 may receive the one or more SSB communications in a previous SSB period that is prior to the SSB period in which the forwarding node 905 is to transmit the one or more SSB communications.

In some aspects, the forwarding node 905 may be agnostic of the signal to be forwarded. For example, the forwarding node 905 may be unaware that the downlink signal to be forwarded is associated with the one or more SSB communications (e.g., rather than some other downlink signal). That is, the forwarding node 905 may process the one or more SSB communications for forwarding in the same manner in which the forwarding node 905 would process any other downlink signal for forwarding.

As shown by reference number 915, the forwarding node 905 may store the one or more SSB communications. For example, the forwarding node 905 may decode or partially decode (e.g., using Rx chain 504) the one or more SSB communications, and store the one or more SSB communications prior to processing the one or more SSB communications using a Tx chain, as described above.

In some aspects, when storing the one or more SSB communications, the forwarding node 905 may perform digital processing of the one or more SSB communications to extract information (e.g., digital information associated with an analog signal of the one or more SSB communications) for storage. In some aspects, the forwarding node 905 may extract time domain IQ samples of the one or more SSB communications (e.g., if the forwarding node 905 is to perform Split Option 8 forwarding). In some aspects, the forwarding node 905 may extract frequency domain IQ samples of the one or more SSB communications (e.g., if the forwarding node 905 is to perform Split Option 7-1 forwarding). In some aspects, the forwarding node 905 May extract IQ symbols of occupied tones (e.g., symbols per antenna) of the one or more SSB communications (e.g., if the forwarding node is to perform Split Option 7-2 forwarding).

As shown by reference number 920, the forwarding node 905 may regenerate the one or more SSB communications. In particular, the forwarding node 905 may regenerate the one or more SSB communications based at least in part on the one or more SSB communications (e.g., the extracted information for the one or more SSB communications) stored by the forwarding node 905. For example, the forwarding node 905 may process the extracted information using a Tx chain (e.g., Tx chain 502), as described above. A level of digital processing used by the forwarding node 905 to regenerate the one or more SSB communications may depend on a level of digital processing performed by the forwarding node 905 when receiving the one or more SSB communications (e.g., to extract the information).

In some aspects, the forwarding node 905 may regenerate a PSS and/or an SSS for the one or more SSB communications, and may separately regenerate a PBCH (e.g., a PBCH communication) and/or a DMRS for the one or more SSB communications. Accordingly, the PSS/SSS to be forwarded and the PBCH/DMRS to be forwarded may be received together or separately at the forwarding node 905. Separate regeneration of the PSS/SSS and the PBCH/DMRS may be useful because the PSS/SSS has a fixed waveform that does not change according to an SSB index or an SSB period in which the PSS/SSS is transmitted, while the PBCH/DMRS changes according to an SSB index or an SSB period in which the PBCH/DMRS is transmitted.

In some aspects (e.g., if the forwarding node 905 is to perform Split Option 7-2 forwarding), the forwarding node 905 may obtain the PSS and/or the SSS that are to be forwarded from an MT of the forwarding node 905. For example, the forwarding node 905 may receive SSBs from the base station 110 at the MT of the forwarding node 905 (e.g., to establish and maintain an access link between the MT of the forwarding node and the base station 110). In some aspects, the forwarding node 905 may store the SSBs (e.g., information extracted from the SSBs) received at the MT. In some aspects, the forwarding node 905 may regenerate the PSS and/or the SSS based at least in part on the SSBs received at the MT.

In some aspects (e.g., if the forwarding node 905 is to perform Split Option 7-2 forwarding), the forwarding node 905 may obtain a physical cell identifier (PCI) associated with the base station 110 (e.g., a PCI carried in a PSS or an SSS transmitted by the base station 110). In some aspects, the forwarding node 905 may store the PCI. In some aspects, the forwarding node 905 may generate the PSS and/or the SSS (e.g., a clean PSS/SSS) based at least in part on the PCI. For example, the forwarding node 905 may determine a scrambling sequence for the PSS and/or the SSS based at least in part on the PCI.

In some aspects (e.g., if the forwarding node 905 is to perform Split Option 7-2 forwarding), the forwarding node 905 may receive the PSS and/or the SSS, for forwarding, once for each SSB period, and the PSS and/or the SSS may be used for all SSBs to be forwarded by the forwarding node 905 in an SSB period. In this case, the forwarding node 905 may receive the PSS and/or the SSS from the base station 110 in a previous SSB period, or another previous time interval, prior to the SSB period in which the forwarding node 905 is to transmit the PSS and/or the SSS. In some aspects (e.g., if the forwarding node 905 is to perform Split Option 7-2 forwarding), the forwarding node 905 may receive the PSS and/or the SSS, for forwarding, once for multiple SSB periods, and the PSS and/or the SSS may be used for all SSBs to be forwarded by the forwarding node 905 in the multiple SSB periods. In this case, the forwarding node 905 may receive the PSS and/or the SSS from the base station 110 in a previous SSB period, or another previous time interval, prior to the multiple SSB periods in which the forwarding node is to transmit the PSS and/or the SSS.

In some aspects, the base station 110 may transmit the PSS and/or the SSS, for forwarding, in off-sync raster resources, as described above. In some aspects, the base station 110 may transmit the PSS and/or the SSS, for forwarding, in a downlink signal (e.g., a FH-PDSCH) generated by resource (e.g., resource element) remapping of the PSS and/or the SSS (e.g., remapping relative to the original PSS and/or SSS, so that the remapped PSS and/or SSS is not identifiable as a PSS and/or an SSS by a UE or another child node of the base station 110). That is, the downlink signal may be based at least in part on a resource remapping of the PSS and/or the SSS.

In some aspects, the forwarding node 905 may store the received PSS and/or the SSS (e.g., information extracted from the PSS and/or the SSS, as described above). In some aspects, the forwarding node 905 may regenerate the PSS and/or the SSS based at least in part on the PSS and/or the SSS (e.g., the extracted information for the PSS and/or the SSS) stored by the forwarding node 905.

In some aspects (e.g., if the forwarding node 905 is to perform Split Option 7-2 forwarding), the forwarding node 905 may receive (e.g., periodically) all PBCHs and/or DMRSs, for forwarding, for an SSB period, and the PBCHs and/or the DMRSs may be used for all SSBs to be forwarded by the forwarding node 905 in the SSB period. In this case, the forwarding node 905 may receive the PBCHs and/or the DMRSs from the base station 110 in a previous SSB period, or another previous time interval, prior to the SSB period in which the forwarding node 905 is to transmit the PBCHs and/or DMRSs.

In some aspects, the base station 110 may transmit the PBCH(s) and/or the DMRS(s), for forwarding, in sync raster resources. That is, the base station 110 may transmit the PBCH(s) and/or the DMRS(s), for forwarding, in resources (e.g., frequency resources) that are also used for SSB transmissions of the base station 110. In some aspects, the base station 110 may transmit the PBCH(s) and/or the DMRS(s), for forwarding, in a downlink signal generated by multiplexing multiple PBCH/DMRS instances. For example, the base station 110 may transmit a downlink signal in which multiple PBCHs/DMRSs, for multiple SSBs, are multiplexed.

In some aspects, the forwarding node 905 may store the PBCH and/or the DMRS (e.g., information extracted from the PBCH and/or the DMRS, as described above). In some aspects, the forwarding node 905 may regenerate the PBCH and/or the DMRS based at least in part on the PBCH and/or the DMRS (e.g., the extracted information for the PBCH and/or the DMRS) stored by the forwarding node 905.

In some aspects (e.g., if the forwarding node is to perform Split Option 7-3 forwarding), the base station 110 may transmit the one or more SSB communications, for forwarding, with additional pilot signals for performing channel estimation and/or channel equalization at the forwarding node 905 (e.g., additional pilot signals relative to the pilot signals associated with the one or more SSB communications for performing channel estimation/equalization at a UE). In this way, the base station 110 may transmit the one or more SSB communications, for forwarding, as an ordinary downlink channel. The forwarding node 905 may perform channel estimation and/or channel equalization, using the additional pilot signals, in order to extract information from the one or more SSB communications, as described above.

In some aspects (e.g., if the forwarding node is to perform Split Option 7-3 forwarding), the forwarding node 905 may perform channel estimation and/or channel equalization using one or more reference sequences (e.g., reference signals) associated with the one or more SSB communications, such as a PSS, an SSS, and/or a DMRS. In such an example, the forwarding node 905 may obtain information relating to the reference sequences (e.g., resource locations and/or sequences being used, among other examples) prior to receiving the one or more SSB communications (e.g., one or more whole SSBs) for forwarding. Accordingly, the forwarding node 905 may use the reference sequence(s) for performing channel estimation and/or channel equalization in order to extract information from the one or more SSB communications for regeneration of the one or more SSB communications, as described above.

In some aspects, the forwarding node 905 may generate the PSS and/or the SSS, as described above, and may separately receive the PBCH and/or the DMRS for forwarding. In this example, the forwarding node 905 may use the generated PSS/SSS for performing channel estimation and/or channel equalization in order to extract information from the PBCH for regenerating the PBCH, as described above.

In some aspects (e.g., if the forwarding node 905 is to perform Split Option 6 forwarding), the forwarding node 905 may decode an SSB (e.g., received at the forwarding node 905 for forwarding, or received at the MT of the forwarding node 905) to determine a content of a master information block (MIB). In some aspects, the forwarding node 905 may store the content of the MIB, as described above. In addition, the forwarding node 905 may receive an indication (e.g., a configuration) from the base station 110 (or another control node) of a transmission time for the MIB (e.g., in connection with an instruction to generate the PBCH). For example, the transmission time may be an SSB index, a half frame, and/or a system frame number, among other examples. In some aspects, the forwarding node 905 may generate the PBCH and/or the DMRS based at least in part on the content of the MIB and the transmission time. For example, the forwarding node 905 may determine a scrambling sequence for the PBCH and/or the DMRS based at least in part on the transmission time.

As shown by reference number 925*a*, the forwarding node 905 may transmit (e.g., forward), and the UE 120 may receive, the one or more SSB communications regenerated by the forwarding node 905. The forwarding node 905 may transmit the one or more SSB communications in a downlink beam sweep, as described above. As shown by reference number 925*b*, the base station 110 may transmit, and the UE 120 (and/or the MT of the forwarding node 905) may receive, one or more SSB communications. The base station 110 may transmit the one or more SSB communications in a downlink beam sweep, as described above. The forwarding node 905 and the base station 110 may transmit the SSB communications in parallel. That is, the forwarding node 905 and the base station 110 may transmit the SSB communications in the same SSB period.

The forwarding node 905 may transmit the one or more SSB communications (referred to hereafter as FN SSBs), and the base station 110 may transmit the one or more SSB communications (referred to hereafter as BS SSBs), according to a joint beam sweeping pattern. In some aspects, the forwarding node 905 may transmit the FN SSBs in resources in which the MT of the forwarding node 905 is not scanning for, and receiving, BS SSBs from the base station 110. Thus, the base station 110 may transmit the BS SSBs in resources that are different from the resources used by the forwarding node 905 for transmitting the FN SSBs (e.g., the base station 110 may transmit the BS SSBs in resources in which the MT of the forwarding node is scanning for, and receiving, BS SSBs). This may be useful when the forwarding node 905 is not operating in a full-duplex mode and/or when self-interference is relatively high at the forwarding node 905.

In some aspects, the FN SSBs transmitted by the forwarding node 905 may be time-division multiplexed with the BS SSBs transmitted by the base station 110 (e.g., the BS SSBs and the FN SSBs may be in orthogonal resources). In this way, the base station 110 (or another control node) may be enabled to differentiate SSBs received at the UE 120, and determine whether the UE 120 is communicating by a direct connection with the base station 110 or an indirect connection (e.g., via the forwarding node 905) with the base station 110. For example, the base station 110 (or another control node) may determine whether a RACH occasion used by the UE 120 is associated with an SSB that was transmitted from the forwarding node 905 or the base station 110. In some aspects, the FN SSBs transmitted by the forwarding node 905 may overlap in time (e.g., using frequency-division multiplexing and/or spatial-division multiplexing) with the BS SSBs transmitted by the base station 110. In this way, network resources may be conserved.

In some aspects, the base station 110 may monitor the FN SSB transmissions and the BS SSB transmissions to identify spatial coverages of the beams used by the base station 110 and the forwarding node 905, respectively. Based at least in part on identifying the spatial coverages, the base station 110 may determine to multiplex (e.g., on the same SSB location) SSB transmissions of the base station 110 and the forwarding node 905 that use beams with non-overlapping coverages. Additionally, or alternatively, the base station 110 may determine to multiplex (e.g., on the same SSB location) SSB transmissions of the base station 110 and the forwarding node 905 that use beams with overlapping coverages (e.g., to improve spatial diversity for the SSB transmissions, such as by introducing combined beams of the base station 110 and the forwarding node 905). The base station 110 (or another control node) may transmit a configuration to the forwarding node 905 that enables the multiplexing determined by the base station 110.

As indicated above, FIG. 9 is provided as an example. Other examples may differ from what is described with respect to FIG. 9.

Figure 10:
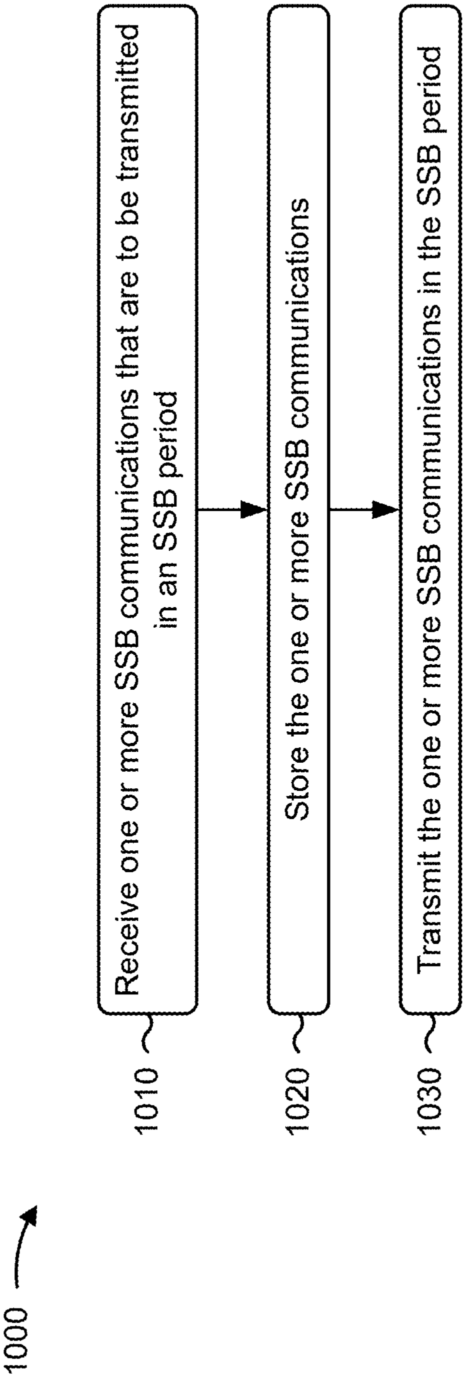
FIGS. 10-11 are diagrams illustrating example processes associated with SSB forwarding, in accordance with the present disclosure.

FIG. 10 is a diagram illustrating an example process 1000 performed, for example, by a forwarding node, in accordance with the present disclosure. Example process 1000 is an example where the forwarding node (e.g., forwarding node 905, UE 120, base station 110, a wireless node, and/or an IAB node, among other examples) performs operations associated with SSB forwarding.

As shown in FIG. 10, in some aspects, process 1000 may include receiving one or more SSB communications that are to be transmitted in an SSB period (block 1010). For example, the forwarding node (e.g., using reception component 1202, depicted in FIG. 12) may receive one or more SSB communications that are to be transmitted in an SSB period, as described above.

As further shown in FIG. 10, in some aspects, process 1000 may include storing the one or more SSB communications (block 1020). For example, the forwarding node (e.g., using storage component 1208, depicted in FIG. 12) may store the one or more SSB communications, as described above.

As further shown in FIG. 10, in some aspects, process 1000 may include transmitting the one or more SSB communications in the SSB period (block 1030). For example, the forwarding node (e.g., using transmission component 1204, depicted in FIG. 12) may transmit the one or more SSB communications in the SSB period, as described above.

Process 1000 may include additional aspects, such as any single aspect or any combination of aspects described below and/or in connection with one or more other processes described elsewhere herein.

In a first aspect, the one or more SSB communications are received in resources that are not in a synchronization raster.

In a second aspect, alone or in combination with the first aspect, process 1000 includes extracting information from the one or more SSB communications, and regenerating the one or more SSB communications based at least in part on the information.

In a third aspect, alone or in combination with one or more of the first and second aspects, process 1000 includes receiving a primary synchronization signal or a secondary synchronization signal at a mobile termination of the forwarding node, and regenerating the primary synchronization signal or the secondary synchronization signal for the one or more SSB communications.

In a fourth aspect, alone or in combination with one or more of the first through third aspects, process 1000 includes generating a primary synchronization signal or a secondary synchronization signal, for the one or more SSB communications, based at least in part on a physical cell identifier associated with a base station.

In a fifth aspect, alone or in combination with one or more of the first through fourth aspects, receiving the one or more SSB communications includes receiving a primary synchronization signal or a secondary synchronization signal for SSBs that are to be transmitted in the SSB period.

In a sixth aspect, alone or in combination with one or more of the first through fifth aspects, receiving the one or more SSB communications includes receiving a primary synchronization signal or a secondary synchronization signal for SSBs that are to be transmitted in the SSB period and one or more additional SSB periods.

In a seventh aspect, alone or in combination with one or more of the first through sixth aspects, receiving the one or more SSB communications includes receiving a primary synchronization signal or a secondary synchronization signal, for the one or more SSB communications, in resources that are not in a synchronization raster.

In an eighth aspect, alone or in combination with one or more of the first through seventh aspects, receiving the one or more SSB communications includes receiving a primary synchronization signal or a secondary synchronization signal, for the one or more SSB communications, in a downlink signal that is based at least in part on a resource remapping of the primary synchronization signal or the secondary synchronization signal.

In a ninth aspect, alone or in combination with one or more of the first through eighth aspects, receiving the one or more SSB communications includes receiving a physical broadcast channel or a demodulation reference signal, for the one or more SSB communications that are to be transmitted in the SSB period, in a time interval that is prior to the SSB period.

In a tenth aspect, alone or in combination with one or more of the first through ninth aspects, receiving the one or more SSB communications includes receiving a physical broadcast channel or a demodulation reference signal, for the one or more SSB communications, in resources that are in a synchronization raster.

In an eleventh aspect, alone or in combination with one or more of the first through tenth aspects, receiving the one or more SSB communications includes receiving multiple physical broadcast channels or demodulation reference signals, for the one or more SSB communications and one or more additional SSB communications, multiplexed in a downlink signal.

In a twelfth aspect, alone or in combination with one or more of the first through eleventh aspects, process 1000 includes performing channel estimation or equalization to extract information from the one or more SSB communications.

In a thirteenth aspect, alone or in combination with one or more of the first through twelfth aspects, the channel estimation or equalization is performed using pilot signals for the forwarding node that are received with the one or more SSB communications.

In a fourteenth aspect, alone or in combination with one or more of the first through thirteenth aspects, the channel estimation or equalization is performed using at least one reference sequence associated with the one or more SSB communications.

In a fifteenth aspect, alone or in combination with one or more of the first through fourteenth aspects, process 1000 includes determining a content of a master information block based at least in part on decoding a physical broadcast channel of the one or more SSB communications, and receiving an indication of a transmission time for the master information block.

In a sixteenth aspect, alone or in combination with one or more of the first through fifteenth aspects, transmitting the one or more SSB communications includes transmitting the one or more SSB communications in the SSB period with one or more additional SSB communications transmitted by a base station.

In a seventeenth aspect, alone or in combination with one or more of the first through sixteenth aspects, the forwarding node is a repeater node.

In an eighteenth aspect, alone or in combination with one or more of the first through seventeenth aspects, process 1000 includes performing digital processing of the one or more SSB communications.

In a nineteenth aspect, alone or in combination with one or more of the first through eighteenth aspects, process 1000 includes forwarding one or more non-SSB communications between a first wireless node and a second wireless node.

In a twentieth aspect, alone or in combination with one or more of the first through nineteenth aspects, the one or more SSB communications are received from a control node.

In a twenty-first aspect, alone or in combination with one or more of the first through twentieth aspects, the control node is a base station.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
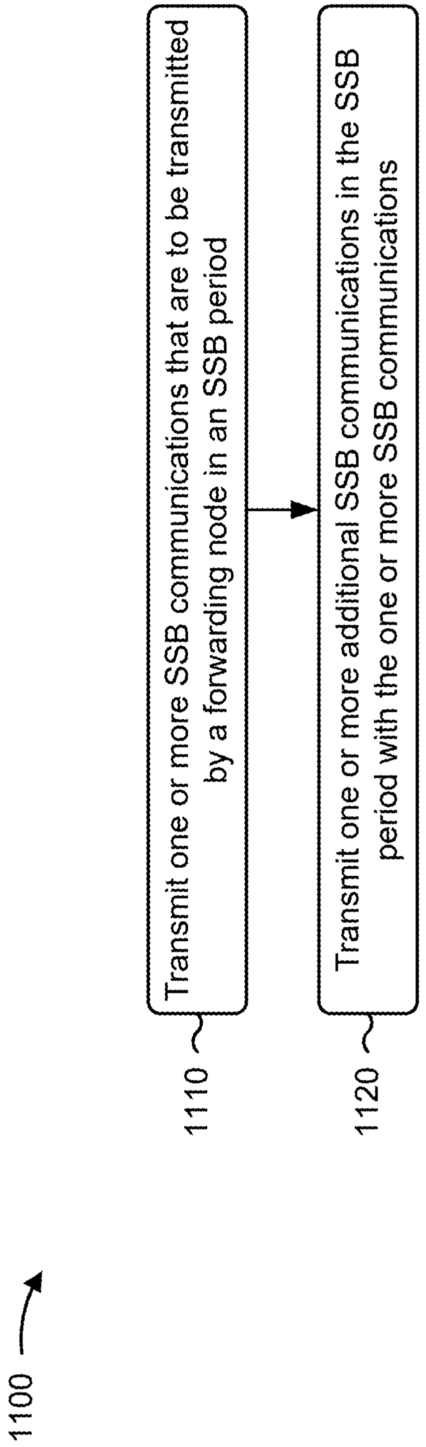

FIG. 11 is a diagram illustrating an example process 1100 performed, for example, by a control node, in accordance with the present disclosure. Example process 1100 is an example where the control node (e.g., base station 110, a wireless node, an IAB node, an IAB donor) performs operations associated with SSB forwarding.

As shown in FIG. 11, in some aspects, process 1100 may include transmitting one or more SSB communications that are to be transmitted by a forwarding node in an SSB period (block 1110). For example, the control node (e.g., using transmission component 1304, depicted in FIG. 13) may transmit one or more SSB communications that are to be transmitted by a forwarding node in an SSB period, as described above.

As further shown in FIG. 11, in some aspects, process 1100 may include transmitting one or more additional SSB communications in the SSB period with the one or more SSB communications (block 1120). For example, the control node (e.g., using transmission component 1304, depicted in FIG. 13) may transmit one or more additional SSB communications in the SSB period with the one or more SSB communications, as described above.

Process 1100 may include additional aspects, such as any single aspect or any combination of aspects described below and/or in connection with one or more other processes described elsewhere herein.

In a first aspect, the one or more SSB communications are transmitted in resources that are not in a synchronization raster.

In a second aspect, alone or in combination with the first aspect, process 1100 includes transmitting a primary synchronization signal or a secondary synchronization signal to a mobile termination of the forwarding node to enable the forwarding node to regenerate the primary synchronization signal or the secondary synchronization signal for the one or more SSB communications.

In a third aspect, alone or in combination with one or more of the first and second aspects, transmitting the one or more SSB communications includes transmitting a primary synchronization signal or a secondary synchronization signal for SSBs that are to be transmitted by the forwarding node in the SSB period.

In a fourth aspect, alone or in combination with one or more of the first through third aspects, transmitting the one or more SSB communications includes transmitting a primary synchronization signal or a secondary synchronization signal for SSBs that are to be transmitted by the forwarding node in the SSB period and one or more additional SSB periods.

In a fifth aspect, alone or in combination with one or more of the first through fourth aspects, transmitting the one or more SSB communications includes transmitting a primary synchronization signal or a secondary synchronization signal, for the one or more SSB communications, in resources that are not in a synchronization raster.

In a sixth aspect, alone or in combination with one or more of the first through fifth aspects, transmitting the one or more SSB communications includes transmitting a primary synchronization signal or a secondary synchronization signal, for the one or more SSB communications, in a downlink signal that is based at least in part on a resource remapping of the primary synchronization signal or the secondary synchronization signal.

In a seventh aspect, alone or in combination with one or more of the first through sixth aspects, transmitting the one or more SSB communications includes transmitting a physical broadcast channel or a demodulation reference signal, for the one or more SSB communications that are to be transmitted by the forwarding node in the SSB period, in a time interval that is prior to the SSB period.

In an eighth aspect, alone or in combination with one or more of the first through seventh aspects, transmitting the one or more SSB communications includes transmitting a physical broadcast channel or a demodulation reference signal, for the one or more SSB communications, in resources that are in a synchronization raster.

In a ninth aspect, alone or in combination with one or more of the first through eighth aspects, transmitting the one or more SSB communications includes transmitting multiple physical broadcast channels or demodulation reference signals, for the one or more SSB communications and one or more additional SSB communications, multiplexed in a downlink signal.

In a tenth aspect, alone or in combination with one or more of the first through ninth aspects, process 1100 includes transmitting pilot signals with the one or more SSB communications that are to be used by the forwarding node for performing channel estimation or equalization.

In an eleventh aspect, alone or in combination with one or more of the first through tenth aspects, the one or more SSB communications are associated with at least one reference sequence that is to be used by the forwarding node for performing channel estimation or equalization.

In a twelfth aspect, alone or in combination with one or more of the first through eleventh aspects, process 1100 includes transmitting an indication of a transmission time for the forwarding node to transmit a master information block that is decoded from a physical broadcast channel of the one or more SSB communications transmitted to the forwarding node.

In a thirteenth aspect, alone or in combination with one or more of the first through twelfth aspects, the forwarding node is a repeater node.

In a fourteenth aspect, alone or in combination with one or more of the first through thirteenth aspects, the control node is a base station.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
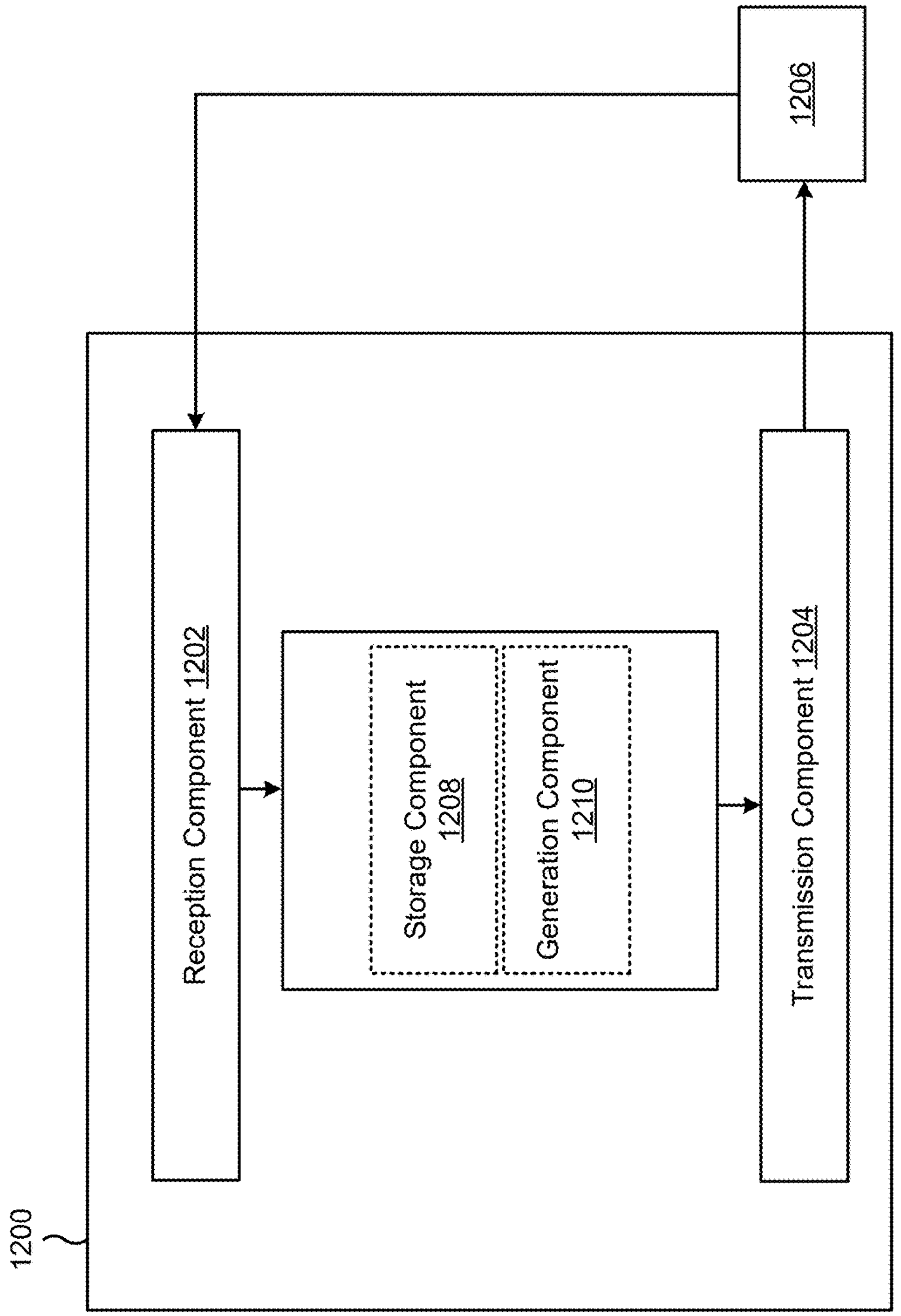
FIGS. 12-13 are block diagrams of example apparatuses for wireless communication, in accordance with the present disclosure.

FIG. 12 is a block diagram of an example apparatus 1200 for wireless communication, in accordance with the present disclosure. The apparatus 1200 may be a forwarding node, or a forwarding node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a storage component 1208 or a generation component 1210, among other examples.

In some aspects, the apparatus 1200 may be configured to perform one or more operations described herein in connection with FIG. 9. Additionally or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the forwarding node described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may perform digital processing on the received communications, as described above. In some aspects, the reception component 1202 may include one or more antennas, a demodulator, a MIMO detector, a receive processor, a controller/processor, a memory, or a combination thereof, of the forwarding node described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may perform digital processing on the generated communications, as described above. In some aspects, the transmission component 1204 may include one or more antennas, a modulator, a transmit MIMO processor, a transmit processor, a controller/processor, a memory, or a combination thereof, of the forwarding node described above in connection with FIG. 2. In some aspects, the transmission component 1204 may be co-located with the reception component 1202 in a transceiver.

The reception component 1202 may receive one or more SSB communications that are to be transmitted in an SSB period. The storage component 1208 may store the one or more first SSB communications. In some aspects, the storage component 1208 may include a demodulator, a MIMO detector, a receive processor, a controller/processor, a memory, or a combination thereof, of the forwarding node described above in connection with FIG. 2. The transmission component 1204 may transmit the one or more SSB communications in the SSB period.

The storage component 1208 may extract information from the one or more first SSB communications.

The generation component 1210 may regenerate the one or more SSB communications based at least in part on the information. The generation component 1210 may regenerate the primary synchronization signal or the secondary synchronization signal for the one or more SSB communications. The generation component 1210 may generate a primary synchronization signal or a secondary synchronization signal, for the one or more SSB communications, based at least in part on a physical cell identifier associated with the base station. In some aspects, the generation component 1210 may include a modulator, a transmit MIMO processor, a transmit processor, a controller/processor, a memory, or a combination thereof, of the forwarding node described above in connection with FIG. 2.

The reception component 1202 may receive a primary synchronization signal or a secondary synchronization signal at a mobile termination of the forwarding node. The reception component 1202 may perform channel estimation or equalization to extract information from the one or more SSB communications. The reception component 1202 may determine a content of a master information block based at least in part on decoding a physical broadcast channel of the one or more SSB communications.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
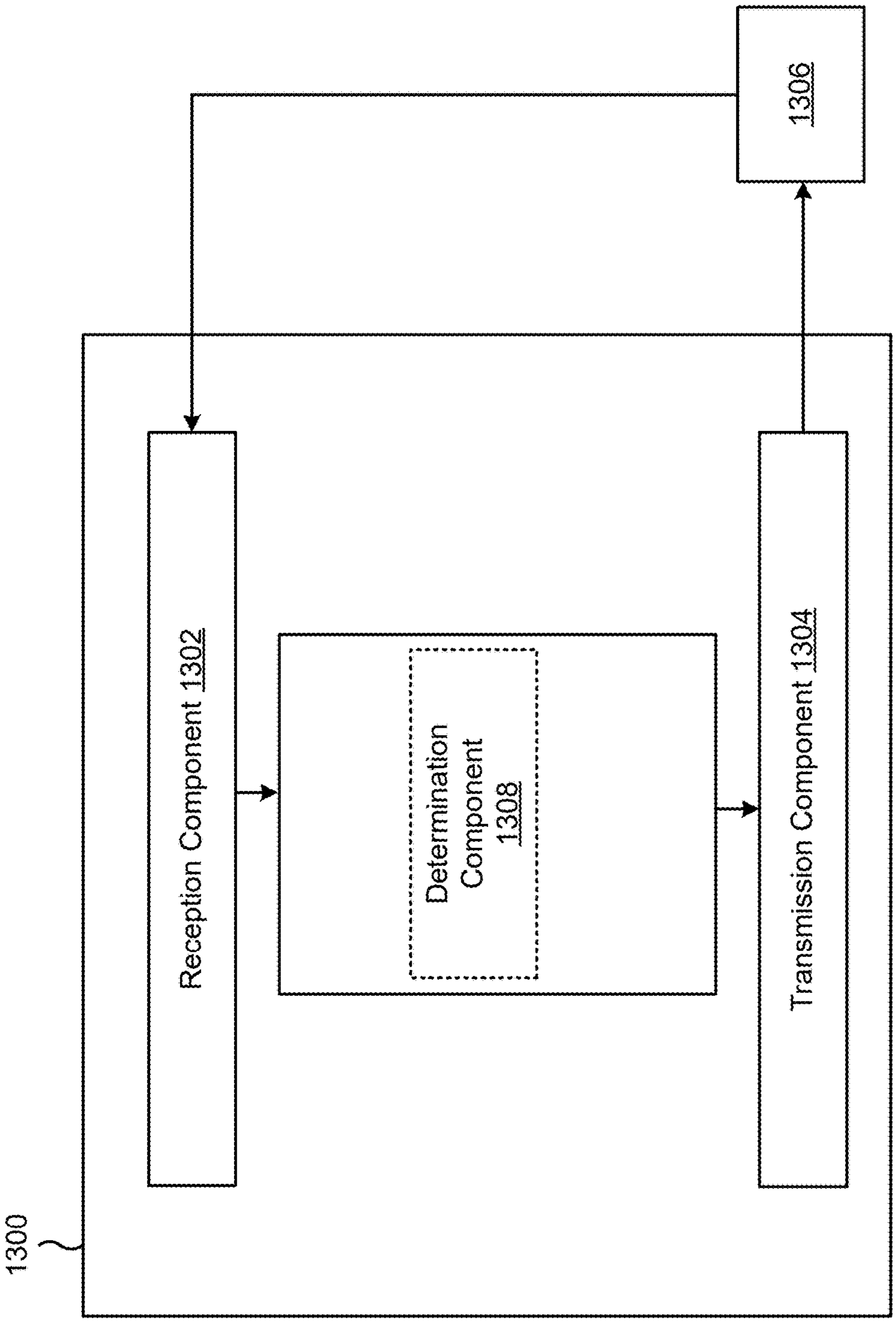

FIG. 13 is a block diagram of an example apparatus 1300 for wireless communication. The apparatus 1300 may be a control node, or a control node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308, among other examples.

In some aspects, the apparatus 1300 may be configured to perform one or more operations described herein in connection with FIG. 9. Additionally or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The determination component 1308 may determine one or more SSB communications that are to be transmitted by a forwarding node in an SSB period. In some aspects, the determination component 1308 may include a controller/processor, a memory, or a combination thereof, of the base station described above in connection with FIG. 2. The transmission component 1304 may transmit the one or more SSB communications to the forwarding node. The transmission component 1304 may transmit one or more additional SSB communications in the SSB period with the one or more SSB communications transmitted by the forwarding node.

The transmission component 1304 may transmit a primary synchronization signal or a secondary synchronization signal to a mobile termination of the forwarding node to enable the forwarding node to regenerate the primary synchronization signal or the secondary synchronization signal for the one or more first SSB communications. The transmission component 1304 may transmit pilot signals with the one or more first SSB communications that are to be used by the forwarding node for performing channel estimation or equalization. The transmission component 1304 may transmit an indication of a transmission time for the forwarding node to transmit a master information block that is decoded from a physical broadcast channel of the one or more first SSB communications transmitted to the forwarding node.

The determination component 1308 may determine a configuration for the apparatus 1306. The determination component 1308 may determine a joint beam sweeping pattern. The determination component 1308 may determine to multiplex SSB transmissions.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a forwarding node, comprising: receiving one or more synchronization signal block (SSB) communications that are to be transmitted in an SSB period; storing the one or more SSB communications; and transmitting the one or more SSB communications in the SSB period.

Aspect 2: The method of Aspect 1, wherein the one or more SSB communications are received in resources that are not in a synchronization raster.

Aspect 3: The method of any of Aspects 1-2, further comprising: extracting information from the one or more SSB communications; and regenerating the one or more SSB communications based at least in part on the information.

Aspect 4: The method of any of Aspects 1-3, further comprising: receiving a primary synchronization signal or a secondary synchronization signal at a mobile termination of the forwarding node; and regenerating the primary synchronization signal or the secondary synchronization signal for the one or more SSB communications.

Aspect 5: The method of any of Aspects 1-2, further comprising: generating a primary synchronization signal or a secondary synchronization signal, for the one or more SSB communications, based at least in part on a physical cell identifier associated with a base station.

Aspect 6: The method of any of Aspects 1-5, wherein receiving the one or more SSB communications comprises: receiving a primary synchronization signal or a secondary synchronization signal for SSBs that are to be transmitted in the SSB period.

Aspect 7: The method of any of Aspects 1-5, wherein receiving the one or more SSB communications comprises: receiving a primary synchronization signal or a secondary synchronization signal for SSBs that are to be transmitted in the SSB period and one or more additional SSB periods.

Aspect 8: The method of any of Aspects 1-7, wherein receiving the one or more SSB communications comprises: receiving a primary synchronization signal or a secondary synchronization signal, for the one or more SSB communications, in resources that are not in a synchronization raster.

Aspect 9: The method of any of Aspects 1-7, wherein receiving the one or more SSB communications comprises: receiving a primary synchronization signal or a secondary synchronization signal, for the one or more SSB communications, in a downlink signal that is based at least in part on a resource remapping of the primary synchronization signal or the secondary synchronization signal.

Aspect 10: The method of any of Aspects 1-9, wherein receiving the one or more SSB communications comprises: receiving a physical broadcast channel or a demodulation reference signal, for the one or more SSB communications that are to be transmitted in the SSB period, in a time interval that is prior to the SSB period.

Aspect 11: The method of any of Aspects 1-10, wherein receiving the one or more SSB communications comprises: receiving a physical broadcast channel or a demodulation reference signal, for the one or more SSB communications, in resources that are in a synchronization raster.

Aspect 12: The method of any of Aspects 1-11, wherein receiving the one or more SSB communications comprises: receiving multiple physical broadcast channels or demodulation reference signals, for the one or more SSB communications and one or more additional SSB communications, multiplexed in a downlink signal.

Aspect 13: The method of any of Aspects 1-12, further comprising: performing channel estimation or equalization to extract information from the one or more SSB communications.

Aspect 14: The method of Aspect 13, wherein the channel estimation or equalization is performed using pilot signals for the forwarding node that are received with the one or more SSB communications.

Aspect 15: The method of Aspect 13, wherein the channel estimation or equalization is performed using at least one reference sequence associated with the one or more SSB communications.

Aspect 16: The method of any of Aspects 1-15, further comprising: determining a content of a master information block based at least in part on decoding a physical broadcast channel of the one or more SSB communications; and receiving an indication of a transmission time for the master information block.

Aspect 17: The method of any of Aspects 1-16, wherein transmitting the one or more SSB communications comprises: transmitting the one or more SSB communications in the SSB period with one or more additional SSB communications transmitted by a base station.

Aspect 18: The method of any of Aspects 1-17, wherein the forwarding node is a repeater node.

Aspect 19: The method of any of Aspects 1-18, further comprising: performing digital processing of the one or more SSB communications.

Aspect 20: The method of any of Aspects 1-19, further comprising: forwarding one or more non-SSB communications between a first wireless node and a second wireless node.

Aspect 21: The method of any of Aspects 1-20, wherein the one or more SSB communications are received from a control node.

Aspect 22: The method of Aspect 21, wherein the control node is a base station.

Aspect 23: A method of wireless communication performed by a control node, comprising: transmitting one or more synchronization signal block (SSB) communications that are to be transmitted by a forwarding node in an SSB period; and transmitting one or more additional SSB communications in the SSB period with the one or more SSB communications.

Aspect 24: The method of Aspect 23, wherein the one or more SSB communications are transmitted in resources that are not in a synchronization raster.

Aspect 25: The method of any of Aspects 23-24, further comprising: transmitting a primary synchronization signal or a secondary synchronization signal to a mobile termination of the forwarding node to enable the forwarding node to regenerate the primary synchronization signal or the secondary synchronization signal for the one or more SSB communications.

Aspect 26: The method of any of Aspects 23-25, wherein transmitting the one or more SSB communications comprises: transmitting a primary synchronization signal or a secondary synchronization signal for SSBs that are to be transmitted by the forwarding node in the SSB period.

Aspect 27: The method of any of Aspects 23-25, wherein transmitting the one or more SSB communications comprises: transmitting a primary synchronization signal or a secondary synchronization signal for SSBs that are to be transmitted by the forwarding node in the SSB period and one or more additional SSB periods.

Aspect 28: The method of any of Aspects 23-27, wherein transmitting the one or more SSB communications comprises: transmitting a primary synchronization signal or a secondary synchronization signal, for the one or more SSB communications, in resources that are not in a synchronization raster.

Aspect 29: The method of any of Aspects 23-27, wherein transmitting the one or more SSB communications comprises: transmitting a primary synchronization signal or a secondary synchronization signal, for the one or more SSB communications, in a downlink signal that is based at least in part on a resource remapping of the primary synchronization signal or the secondary synchronization signal.

Aspect 30: The method of any of Aspects 23-29, wherein transmitting the one or more SSB communications comprises: transmitting a physical broadcast channel or a demodulation reference signal, for the one or more SSB communications that are to be transmitted by the forwarding node in the SSB period, in a time interval that is prior to the SSB period.

Aspect 31: The method of any of Aspects 23-30, wherein transmitting the one or more SSB communications comprises: transmitting a physical broadcast channel or a demodulation reference signal, for the one or more SSB communications, in resources that are in a synchronization raster.

Aspect 32: The method of any of Aspects 23-31, wherein transmitting the one or more SSB communications comprises: transmitting multiple physical broadcast channels or demodulation reference signals, for the one or more SSB communications and one or more additional SSB communications, multiplexed in a downlink signal.

Aspect 33: The method of any of Aspects 23-32, further comprising: transmitting pilot signals with the one or more SSB communications that are to be used by the forwarding node for performing channel estimation or equalization.

Aspect 34: The method of any of Aspects 23-32, wherein the one or more SSB communications are associated with at least one reference sequence that is to be used by the forwarding node for performing channel estimation or equalization.

Aspect 35: The method of any of Aspects 23-34, further comprising: transmitting an indication of a transmission time for the forwarding node to transmit a master information block that is decoded from a physical broadcast channel of the one or more SSB communications transmitted to the forwarding node.

Aspect 36: The method of any of Aspects 23-35, wherein the forwarding node is a repeater node.

Aspect 37: The method of any of Aspects 23-36, wherein the control node is a base station.

Aspect 38: An apparatus for wireless communication at a device, comprising a processor; memory coupled with the processor; and instructions stored in the memory and executable by the processor to cause the apparatus to perform the method of one or more Aspects of Aspects 1-22.

Aspect 39: A device for wireless communication, comprising a memory and one or more processors coupled to the memory, the memory and the one or more processors configured to perform the method of one or more Aspects of Aspects 1-22.

Aspect 40: An apparatus for wireless communication, comprising at least one means for performing the method of one or more Aspects of Aspects 1-22.

Aspect 41: A non-transitory computer-readable medium storing code for wireless communication, the code comprising instructions executable by a processor to perform the method of one or more Aspects of Aspects 1-22.

Aspect 42: A non-transitory computer-readable medium storing a set of instructions for wireless communication, the set of instructions comprising one or more instructions that, when executed by one or more processors of a device, cause the device to perform the method of one or more Aspects of Aspects 1-22.

Aspect 38: An apparatus for wireless communication at a device, comprising a processor; memory coupled with the processor; and instructions stored in the memory and executable by the processor to cause the apparatus to perform the method of one or more Aspects of Aspects 23-37.

Aspect 39: A device for wireless communication, comprising a memory and one or more processors coupled to the memory, the memory and the one or more processors configured to perform the method of one or more Aspects of Aspects 23-37.

Aspect 40: An apparatus for wireless communication, comprising at least one means for performing the method of one or more Aspects of Aspects 23-37.

Aspect 41: A non-transitory computer-readable medium storing code for wireless communication, the code comprising instructions executable by a processor to perform the method of one or more Aspects of Aspects 23-37.

Aspect 42: A non-transitory computer-readable medium storing a set of instructions for wireless communication, the set of instructions comprising one or more instructions that, when executed by one or more processors of a device, cause the device to perform the method of one or more Aspects of Aspects 23-37.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A forwarding node for wireless communication, comprising:

one or more memories; and one or more processors, coupled to the one or more memories, configured to cause the forwarding node to:

receive, based at least in part on a reception configuration associated with the forwarding node, one or more synchronization signal block (SSB) communications that are to be transmitted, in an SSB period and one or more additional SSB periods, prior to a time period in which a network node will be transmitting the one or more SSB communications, wherein the reception configuration specifies first time-frequency resources and a first beamforming configuration for receiving the one or more SSB communications;

extract information from the one or more SSB communications;

store the extracted information from the one or more SSB communications, wherein the extracted information includes at least one of time domain in-phase and quadrature (IQ) samples, frequency domain IQ samples, or IQ symbols of occupied tones of the one or more SSB communications; and transmit, based at least in part on a transmission configuration associated with the forwarding node, a regenerated version of the one or more SSB communications in the SSB period, wherein the regenerated version of the one or more SSB communications is based at least in part on the extracted information, wherein the transmission configuration specifies second time-frequency resources and a second beamforming configuration for transmitting the regenerated version of one or more SSB communications, and wherein the regenerated version comprises:

a regenerated primary synchronization signal or a regenerated secondary synchronization signal for the one or more SSB communications, and a regenerated physical broadcast channel or a regenerated demodulation reference signal for the one or more SSB communications.

2. The forwarding node of claim 1, wherein the one or more SSB communications are received in the first time-frequency resources that are not in a synchronization raster.

3. The forwarding node of claim 1, wherein the one or more processors are further configured to cause the forwarding node to:

receive a primary synchronization signal or a secondary synchronization signal at a mobile termination of the forwarding node; and regenerate the primary synchronization signal or the secondary synchronization signal for the one or more SSB communications.

4. The forwarding node of claim 1, wherein the one or more processors are further configured to cause the forwarding node to:

generate a primary synchronization signal or a secondary synchronization signal, for the one or more SSB communications, based at least in part on a physical cell identifier associated with the network node.

5. The forwarding node of claim 1, wherein the one or more processors, to receive the one or more SSB communications, are configured to cause the forwarding node to:

receive a primary synchronization signal or a secondary synchronization signal for the one or more SSB communications.

6. The forwarding node of claim 5, wherein the primary synchronization signal or the secondary synchronization signal is received in a downlink signal that is based at least in part on a resource remapping of the primary synchronization signal or the secondary synchronization signal.

7. The forwarding node of claim 1, wherein the one or more processors, to receive the one or more SSB communications, are configured to cause the forwarding node to:

receive a physical broadcast channel or a demodulation reference signal, for the one or more SSB communications, in a time interval that is prior to the SSB period.

8. The forwarding node of claim 1, wherein the one or more processors, to receive the one or more SSB communications, are configured to cause the forwarding node to:

receive a physical broadcast channel or a demodulation reference signal, for the one or more SSB communications, in resources that are in a synchronization raster.

9. The forwarding node of claim 1, wherein the one or more processors, to receive the one or more SSB communications, are configured to cause the forwarding node to:

receive multiple physical broadcast channels or demodulation reference signals, for the one or more SSB communications and one or more additional SSB communications, multiplexed in a downlink signal.

10. The forwarding node of claim 1, wherein the one or more processors are further configured to cause the forwarding node to:

determine a content of a master information block based at least in part on decoding a physical broadcast channel of the one or more SSB communications; and receive an indication of a transmission time for the master information block.

11. The forwarding node of claim 1, wherein the one or more processors, to transmit the regenerated version of the one or more SSB communications, are configured to cause the forwarding node to:

transmit the regenerated version of the one or more SSB communications in the SSB period with one or more additional SSB communications transmitted by the network node.

12. A control node for wireless communication, comprising:

one or more memories;

one or more processors, coupled to the one or more memories, configured to cause the control node to:

transmit, to a forwarding node and based at least in part on a reception configuration associated with the forwarding node, one or more synchronization signal block (SSB) communications that are to be transmitted, by the forwarding node in an SSB period and one or more additional SSB periods, prior to a time period in which a network node will be transmitting the one or more SSB communications, wherein the reception configuration specifies first time-frequency resources and a first beamforming configuration for receiving the one or more SSB communications; and transmit, to a user equipment (UE) and based at least in part on a transmission configuration, one or more additional SSB communications, according to a joint beam sweeping pattern associated with the control node and the forwarding node, in the SSB period with the one or more SSB communications, wherein the transmission configuration specifies second time-frequency resources and a second beamforming configuration for transmitting a regenerated version of the one or more SSB communications by the forwarding node, wherein the one or more additional SSB communications are transmitted after the regenerated version of the one or more SSB communications are transmitted by the forwarding node to the UE, and wherein the one or more additional SSB communications are transmitted in third time-frequency resources different from second time-frequency resources used by the forwarding node to transmit the regenerated version of the one or more SSB communications.

13. The control node of claim 12, wherein the third time-frequency resources in which the one or more additional SSB communications are transmitted are not in a synchronization raster.

14. The control node of claim 12, wherein the one or more processors are further configured to cause the forwarding node to:

transmit a primary synchronization signal or a secondary synchronization signal to a mobile termination of the forwarding node to enable the forwarding node to regenerate the primary synchronization signal or the secondary synchronization signal for the one or more SSB communications.

15. The control node of claim 12, wherein the one or more processors, to transmit the one or more SSB communications, are configured to cause the forwarding node to:

transmit a primary synchronization signal or a secondary synchronization signal for the one or more SSB communications.

16. The control node of claim 15, wherein the primary synchronization signal or the secondary synchronization signal is transmitted in a downlink signal that is based at least in part on a resource remapping of the primary synchronization signal or the secondary synchronization signal.

17. The control node of claim 12, wherein the one or more processors, to transmit the one or more SSB communications, are configured to cause the forwarding node to:

transmit a physical broadcast channel or a demodulation reference signal, for the one or more SSB communications, in a time interval that is prior to the SSB period.

18. The control node of claim 12, wherein the one or more processors, to transmit the one or more SSB communications, are configured to cause the forwarding node to:

transmit a physical broadcast channel or a demodulation reference signal, for the one or more SSB communications, in the first time-frequency resources that are in a synchronization raster.

19. The control node of claim 12, wherein the one or more processors, to transmit the one or more SSB communications, are configured to cause the forwarding node to:

transmit multiple physical broadcast channels or demodulation reference signals, for the one or more SSB communications and the one or more additional SSB communications, multiplexed in a downlink signal.

20. The control node of claim 12, wherein the one or more processors are further configured to cause the forwarding node to:

transmit an indication of a transmission time for the forwarding node to transmit a master information block that is decoded from a physical broadcast channel of the one or more SSB communications transmitted to the forwarding node.

21. A method of wireless communication performed by a forwarding node, comprising:

receiving, based at least in part on a reception configuration associated with the forwarding node, one or more synchronization signal block (SSB) communications that are to be transmitted, in an SSB period and one or more additional SSB periods, prior to a time period in which a network node will be transmitting the one or more SSB communications, wherein the reception configuration specifies first time-frequency resources and a first beamforming configuration for receiving the one or more SSB communications;

extracting information from the one or more SSB communications;

storing the extracted information from the one or more SSB communications, wherein the extracted information includes at least one of time domain in-phase and quadrature (IQ) samples, frequency domain IQ samples, or IQ symbols of occupied tones of the one or more SSB communications; and transmitting, based at least in part on a transmission configuration associated with the forwarding node, a regenerated version of the one or more SSB communications in the SSB period, wherein the regenerated version of the one or more SSB communications is based at least in part on the extracted information, wherein the transmission configuration specifies second time-frequency resources and a second beamforming configuration for transmitting the regenerated version of one or more SSB communications, and wherein the regenerated version comprises:

a regenerated primary synchronization signal or a regenerated secondary synchronization signal for the one or more SSB communications, and a regenerated physical broadcast channel or a regenerated demodulation reference signal for the one or more SSB communications.

22. The method of claim 21, wherein the one or more SSB communications are received in the first time-frequency resources that are not in a synchronization raster.

23. The method of claim 21, wherein transmitting the one or more SSB communications comprises:

transmitting the one or more SSB communications in the SSB period with one or more additional SSB communications transmitted by the network node.

24. A method of wireless communication performed by a control node, comprising:

transmitting, to a forwarding node and based at least in part on a reception configuration associated with the forwarding node, one or more synchronization signal block (SSB) communications that are to be transmitted by the forwarding node, in an SSB period and one or more additional SSB periods, prior to a time period in which a network node will be transmitting the one or more SSB communications, wherein the reception configuration specifies first time-frequency resources and a first beamforming configuration for receiving the one or more SSB communications; and transmitting, to a user equipment (UE) and based at least in part on a transmission configuration associated with the forwarding node, one or more additional SSB communications, according to a joint beam sweeping pattern associated with the control node and forwarding node, in the SSB period with the one or more SSB communications, wherein the transmission configuration specifies second time-frequency resources and a second beamforming configuration for transmitting a regenerated version of the one or more SSB communications by the forwarding node, wherein the one or more additional SSB communications are transmitted after the regenerated version of the one or more SSB communications are transmitted by the forwarding node to the UE, and wherein the one or more additional SSB communications are transmitted in third time-frequency resources different from the second time-frequency resources used by the forwarding node to transmit the regenerated version of the one or more SSB communications.

25. The method of claim 24, wherein the third time-frequency resources are not in a synchronization raster.

26. The method of claim 24, further comprising:

transmitting an indication of a transmission time for the forwarding node to transmit a master information block that is decoded from a physical broadcast channel of the one or more SSB communications transmitted to the forwarding node.

27. The forwarding node of claim 1, wherein the one or more processors are further configured to cause the forwarding node to:

receive the reception configuration, wherein the reception configuration is further associated with receiving the one or more SSB communications.

28. The method of claim 21, further comprising:

receiving the reception configuration, wherein the reception configuration is further associated with receiving the one or more SSB communications.

29. The method of claim 21, further comprising:

receiving a primary synchronization signal or a secondary synchronization signal at a mobile termination of the forwarding node; and regenerating the primary synchronization signal or the secondary synchronization signal for the one or more SSB communications.

30. The method of claim 21, further comprising:

generating a primary synchronization signal or a secondary synchronization signal, for the one or more SSB communications, based at least in part on a physical cell identifier associated with the network node.

* * * * *